(12) United States Patent
Kim et al.

(10) Patent No.: US 12,299,867 B2
(45) Date of Patent: May 13, 2025

(54) APPARATUS FOR INSPECTING APPEARANCE OF SECONDARY BATTERY

(71) Applicant: ENSCAPE CO., LTD., Seongnam-si (KR)

(72) Inventors: Nam Dong Kim, Suwon-si (KR); Sang Sik Min, Hwaseong-si (KR); Won Young Jeong, Suwon-si (KR); Jae Hyuk Choi, Gimpo-si (KR); Jin Hyeok Ko, Seoul (KR); Yong Deong Kang, Seongnam-si (KR); Sang Baek Kim, Seongnam-si (KR)

(73) Assignee: ENSCAPE CO., LTD., Seongnam-si (KR)

( * ) Notice: Subject to any disclaimer, the term of this patent is extended or adjusted under 35 U.S.C. 154(b) by 346 days.

(21) Appl. No.: 18/051,813

(22) Filed: Nov. 1, 2022

(65) Prior Publication Data

US 2023/0342904 A1    Oct. 26, 2023

(30) Foreign Application Priority Data

Apr. 25, 2022 (KR) .................... 10-2022-0050995
Jul. 28, 2022 (KR) .................... 10-2022-0094195

(51) Int. Cl.
| | |
|---|---|
| *G06T 7/00* | (2017.01) |
| *B25J 11/00* | (2006.01) |
| *G06T 7/11* | (2017.01) |
| *H01M 10/42* | (2006.01) |
| *H04N 23/695* | (2023.01) |
| *H04N 23/74* | (2023.01) |
| *H04N 23/90* | (2023.01) |

(52) U.S. Cl.
CPC .......... *G06T 7/0004* (2013.01); *B25J 11/005* (2013.01); *G06T 7/11* (2017.01); *H01M 10/4285* (2013.01); *H04N 23/695* (2023.01); *H04N 23/74* (2023.01); *H04N 23/90* (2023.01); *G06T 2207/10152* (2013.01); *G06T 2207/20212* (2013.01)

(58) Field of Classification Search
CPC ....... G06T 7/11; G06T 7/0004; H04N 23/695; H04N 23/74; H04N 23/70; H01M 10/4285; B25J 11/005
See application file for complete search history.

(56) References Cited

U.S. PATENT DOCUMENTS

2009/0245614 A1    10/2009  Baldwin et al.
2021/0184280 A1*    6/2021  Kim ................... G01N 21/9515

FOREIGN PATENT DOCUMENTS

| | | |
|---|---|---|
| CN | 104296690 A | 1/2015 |
| EP | 3 799 189 A1 | 3/2021 |
| JP | H11-211442 A | 8/1999 |
| JP | 2017-72382 A | 4/2017 |

(Continued)

OTHER PUBLICATIONS

The Extended European Search Report for European Patent Application No. 22205236.7, dated Sep. 25, 2023.

*Primary Examiner* — Kathleen V Nguyen

(57) ABSTRACT

Disclosed is an appearance inspection apparatus for a secondary battery, which simultaneously obtains laterals image by picking up a plurality of secondary batteries loaded in a tray, and then simultaneously obtains top and bottom images of the secondary batteries by returning the plurality of inspected secondary batteries back to the tray and transporting the tray.

19 Claims, 27 Drawing Sheets

(56) References Cited

FOREIGN PATENT DOCUMENTS

| KR | 10-2011-0018080 A | 2/2011 |
|---|---|---|
| KR | 10-1030449 B1 | 4/2011 |
| KR | 10-2386324 B1 | 4/2022 |

* cited by examiner

APPARATUS FOR INSPECTING APPEARANCE OF SECONDARY BATTERY

CROSS REFERENCE TO RELATED APPLICATION

This application claims the benefit of Korean Patent Applications 10-2022-0050995 filed on Apr. 25, 2022 and No. 10-2022-0094195 filed on Jul. 28, 2022 in the Korean Intellectual Property Office, the disclosure of which is incorporated by reference herein in its entirety.

BACKGROUND OF THE INVENTION

Field of the Invention

The disclosure relates to an apparatus for inspecting the appearance of a secondary battery.

Description of the Related Art

The disclosure relates to an apparatus for inspecting a cab used in manufacturing a secondary battery.

DESCRIPTION OF THE RELATED ART

A secondary battery refers to a battery that supplies electric power to the outside by converting chemical energy into electrical energy, and receives and stores external power from the outside, when discharged, by converting electrical energy into chemical energy. With development of electronic devices, the secondary battery is being applied to various apparatuses in various fields.

Such a secondary battery is produced in various shapes. As one of various shapes, a cylindrical shape is applied to the secondary battery like a cylindrical battery that has been generally used and is still widely used.

A cylindrical secondary battery has a curved lateral surface, and therefore a method of inspecting the outer appearance of the cylindrical secondary battery while rotating the cylindrical secondary battery 360 degrees is generally used.

An appearance inspection apparatus for the cylindrical secondary battery has been disclosed in Korean Patent No. 1030449 (published on Apr. 25, 2011).

However, such a conventional inspection apparatus has a problem of a low inspection efficiency because one or two cameras are used in inspecting one battery in order to inspect the lateral surface of the battery.

SUMMARY OF THE INVENTION

An aspect of the disclosure is to provide an apparatus for inspecting an appearance of a secondary battery so as to solve a problem of a low inspection efficiency in a conventional inspection apparatus for a cylindrical secondary battery.

According to an embodiment of the disclosure, there is provided an appearance inspection apparatus for a secondary battery, in which a 360-degree lateral image of a secondary battery, which is obtained with light emitted in various combinations, is used to inspect an outer appearance while picking up and rotating a plurality of secondary batteries at a time.

Further, there is provided an appearance inspection apparatus for a secondary battery, in which top and bottom images of a secondary battery are obtainable while the secondary battery is being loaded in a tray.

DETAILED DESCRIPTION OF THE INVENTION

Figure 1:
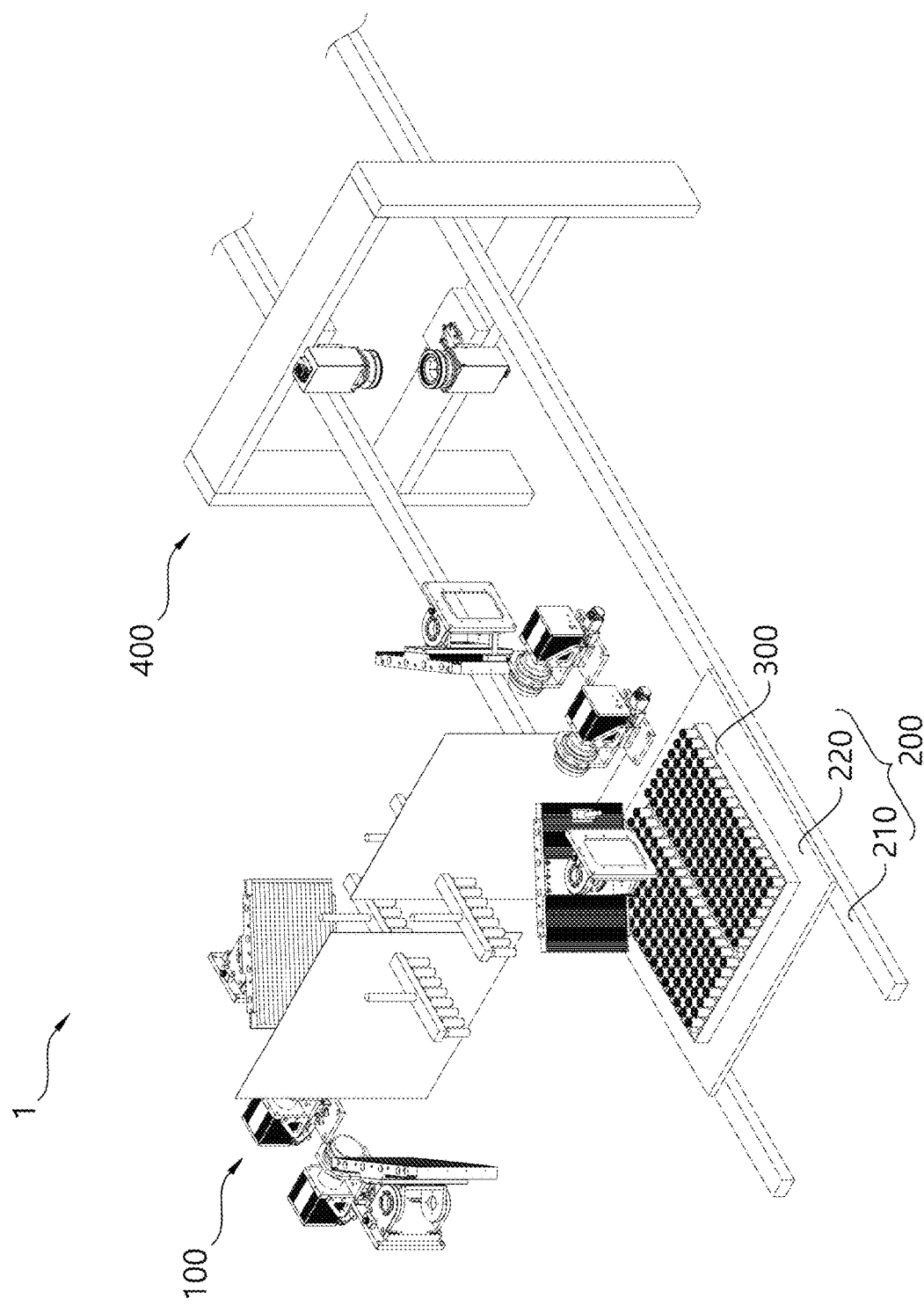
FIG. 1 is a perspective view of an appearance inspection apparatus for a cylindrical secondary battery according to an embodiment of the disclosure.

Hereinafter, an apparatus for inspecting an appearance of a secondary battery according to embodiments of the disclosure will be described in detail with reference to the accompanying drawings. The names of elements used in the following description may be referred to as other names in the art. However, these elements may be considered as equivalent elements in alternative embodiments as long as they have functional similarity and identity. Further, the reference numerals of the elements are provided for the convenience of description. However, the elements indicated by the reference numerals in the drawings are not limited to the scope shown in the drawings. Similarly, even though some elements in the drawings are modified in alternative embodiments, these elements are considered as equivalent elements as long as they have functional similarity and identity. Further, when elements are regarded as elements that should be naturally included at the level of those skilled in the art, descriptions thereof will be omitted.

FIG. 1 is a perspective view of an appearance inspection apparatus for a cylindrical secondary battery according to an embodiment of the disclosure.

Referring to FIG. 1, an appearance inspection apparatus 1 for a cylindrical secondary battery according to an embodiment of the disclosure is configured to inspect the outer appearance, such as the top, bottom and lateral surfaces of the assembled secondary battery.

The appearance inspection apparatus 1 for the cylindrical secondary battery according to an embodiment of the disclosure may include a lateral inspection module 100 to inspect the lateral surface of the cylindrical secondary battery, top and bottom inspection modules 400 to inspect the top and bottom surfaces of the cylindrical secondary battery, and a tray shuttle 220.

The lateral inspection module 100 may pick up and transport a predetermined number of cylindrical secondary batteries to an inspection position, and obtain a lateral image of the cylindrical secondary battery while rotating the cylindrical secondary battery. In this case, the lateral image of the secondary battery is obtained as it is divided into a plurality of pieces, and such a plurality of divided images are then composited and generated as one image of the entire lateral surface of the secondary battery, thereby determining whether there is a defect. When the lateral inspection for the plurality of secondary batteries picked up once is completed, another secondary battery loaded onto a tray 300 is picked up and subjected to the lateral inspection.

When the lateral inspection for the plurality of secondary batteries loaded onto one tray 300 is completed, the tray 300 is transported and subjected to the appearance inspection for the top and bottom.

The top and bottom inspection modules 400 are configured to capture the secondary battery at opposite sides along a lengthwise direction, i.e., a direction where the top and bottom of the transported secondary battery are arranged. In other words, the top and bottom inspection modules 400 may include a pair of top and bottom cameras configured to take images while facing each other, and the secondary battery may be transported to a space between the pair of top and bottom cameras. Then, the top and bottom inspection modules 400 are configured to obtain the top and bottom inspection images of all the secondary batteries loaded onto the tray 300 while moving the position of the tray 300 and the positions of the pair of top and bottom cameras along the arrangement direction of the secondary batteries, and then take out the tray 300.

The tray shuttle 200 is configured to transport the tray 300 onto which the plurality of secondary batteries 1000 are loaded. The tray shuttle 200 may receive the tray 300 from another external inspection apparatus and transport the received tray 300 to the lateral inspection module, or transport the tray 300 from the lateral inspection module to the top and bottom inspection modules. Further, the tray shuttle 200 may be configured to take the tray out after the inspection for the lateral, top and bottom surfaces of the secondary battery is completed.

The tray shuttle 200 may be provided as a widely used common element such as a conveyor, a robot arm or the like for transporting the tray 300. For example, the tray shuttle 200 may include a linear guide 210 provided between the lateral inspection module 100 and the top and bottom inspection modules 400 to transport the tray 300. The linear guide 210 may include a tray holder 220 to temporarily hold the transported tray 300. The tray holder 220 may transport the tray 300 by a predetermined distance (or step), and may transport the tray 300 to a space between the lateral inspection module 100 and the top and bottom inspection modules 400. Meanwhile, although it is not shown, an actuator may be provided to transport the tray holder 220.

With reference to this drawing, it is described by way of example that the lateral inspection for the secondary battery is performed and then the top and bottom inspection is performed. Alternatively, the arrangement may be adjusted such that the top and bottom inspection is performed and the lateral inspection is then performed, and the transport direction of the tray holder may be set reversely.

Meanwhile, although it is not shown, a cell check unit may be provided. The cell check unit may check whether an battery is not loaded in the tray and reflects the check result in control. In other words, when information about an empty cell is received, the controller may control to skip the empty cell and inspect the secondary battery loaded in the next cell.

Meanwhile, the configurations and functions of the lateral inspection module and the top and bottom inspection modules will be described later in detail.

Figure 2:
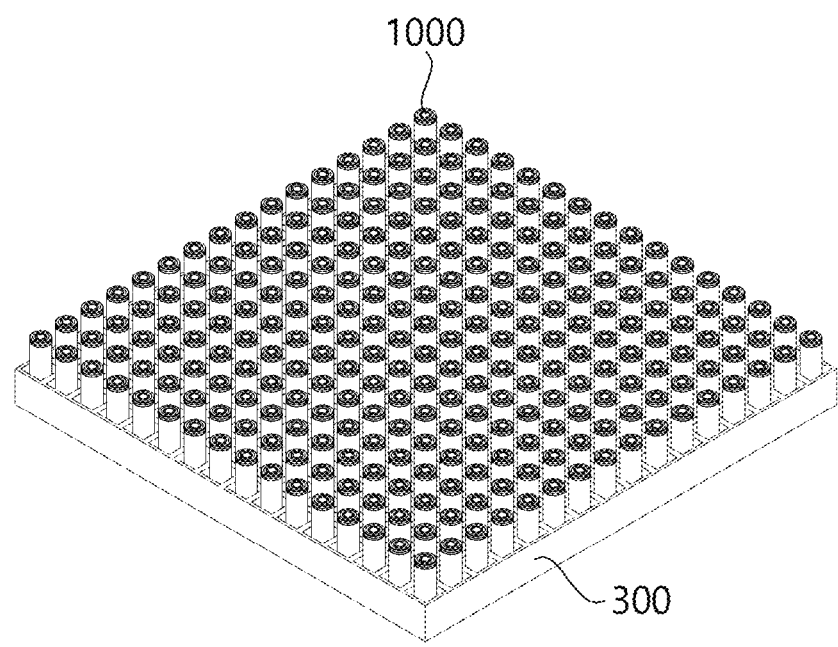
FIG. 2 is a perspective view of a secondary battery loading tray.
Figure 3:
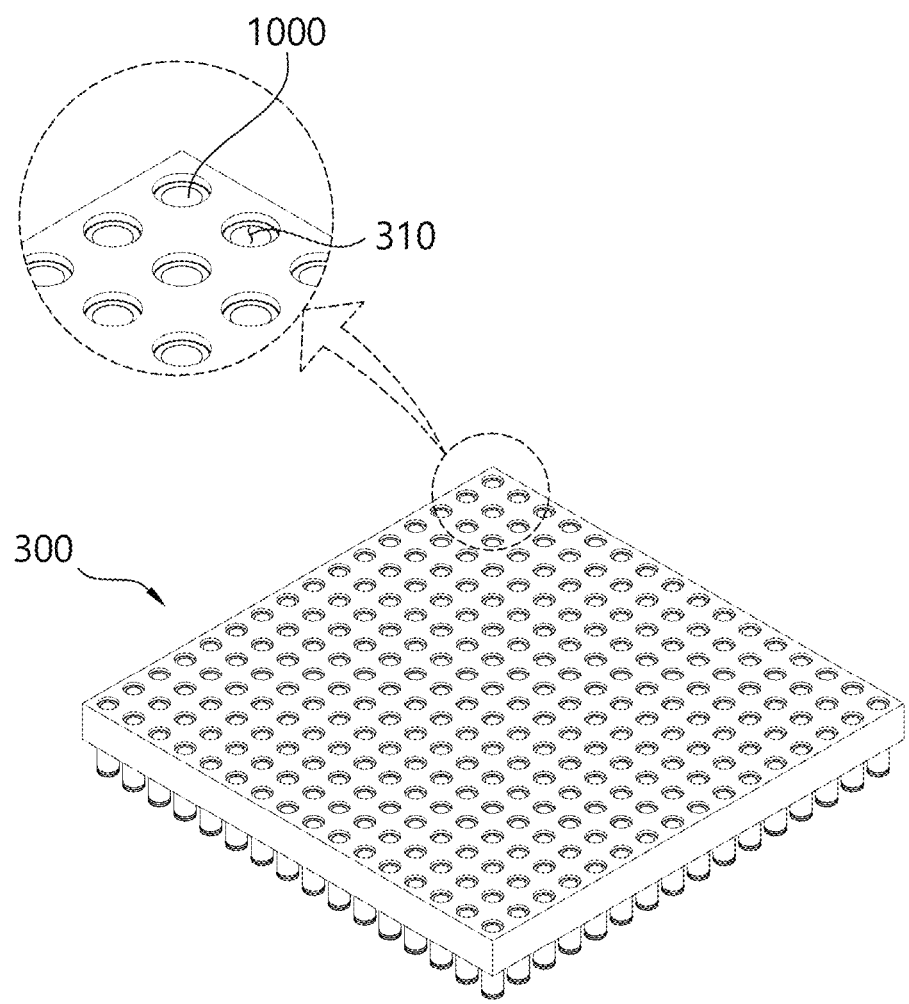
FIG. 3 is a bottom perspective view of a secondary battery loading tray.

FIG. 2 is a perspective view of a secondary battery loading tray, and FIG. 3 is a bottom perspective view of a secondary battery loading tray.

Referring to FIGS. 2 and 3, the tray 300 according to the disclosure is configured to be loaded with a plurality of secondary batteries. In this case, the secondary batteries 1000 may be loaded in a lengthwise direction, i.e., a direction where the tops and bottoms thereof are arranged side by side. The tray 300 is provided with loading spaces along a predetermined array, and each loading space may be loaded with one secondary battery 1000. In this case, a distance between adjacent secondary batteries 1000 may be set not to cause interference when a hand picks up the secondary battery 1000. Therefore, the distance between the loading spaces may be set on the tray 300.

The tray 300 may be formed with a hole 310 having a predetermined inner diameter on the bottom thereof, so that the bottom image of the secondary battery 1000 can be obtained. Therefore, it is possible to obtain the top and bottom images of the secondary battery even though the secondary battery is not taken out of the tray 300. The hole 310 in the tray 300 may be large enough to expose the bottom of the secondary battery as much as possible without separating the secondary battery.

Below, the lateral inspection module according to an embodiment of the disclosure will be described in detail with reference to FIGS. 4 to 20.

Figure 4:
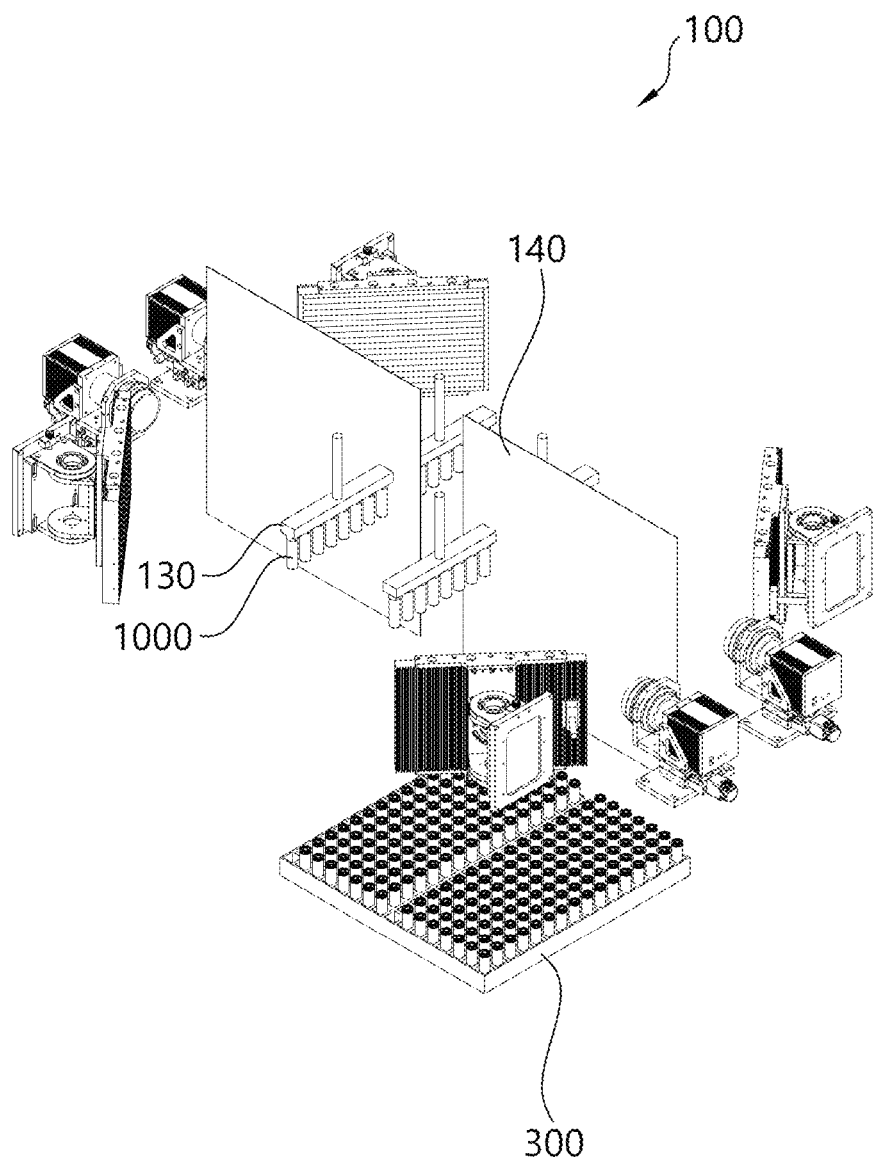
FIG. 4 is a perspective view of a lateral inspection module of a secondary battery.
Figure 5:
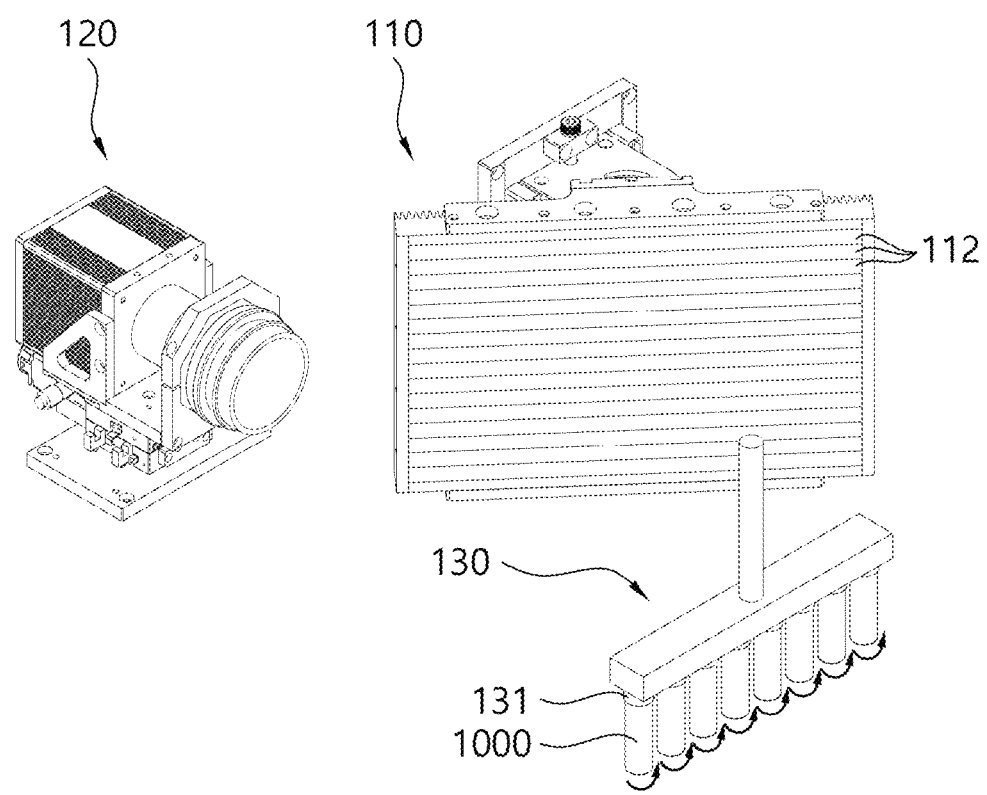
FIG. 5 is a perspective view of a lateral inspection module with respect to an inspection position.

FIG. 4 is a perspective view of the lateral inspection module of the secondary battery, and FIG. 5 is a perspective view of the lateral inspection module with respect to an inspection position.

Below, the lateral inspection module according to the disclosure will be described in detail with reference to FIGS. 4 and 5. In the following descriptions, the base, the frame, and the like elements and their connection positions are generally widespread and variously changeable, and therefore descriptions thereof will be omitted.

Referring to FIG. 4, the lateral inspection module 100 according to an embodiment of the disclosure may include a hand 130, a blocking plate 140, a lateral vision module 110, an image processor (not shown), and a controller (not shown).

The hand 130 may be configured to pick up the plurality of secondary batteries 1000. The hand 130 may include a plurality of actuators and guides for three-axial movement. The hand 130 may include a plurality of gripper modules 131 arranged at a lower side thereof and used to selectively grip the secondary battery. Each gripper module 131 may be configured to pick up and rotate one side of the secondary battery 1000. For example, the plurality of secondary batteries may be loaded in the tray 300 in the lengthwise direction, i.e., a vertical direction, and the hand 130 may grip an upper part of the secondary battery with the gripper by moving downward from above the tray, pick up the secondary battery and then transport the secondary battery to an inspection position for the lateral inspection. During the lateral inspection, the plurality of gripper modules 131 may be synchronized to be simultaneously rotated at the same angle. The hand 130 is configured to transport the inspected secondary battery 1000 to be returned back to and reloaded in the tray 300. By repeating this process, all the plurality of secondary batteries 1000 loaded in one tray 300 are subjected to the lateral inspection.

The blocking plate 140 is configured to prevent optical interference when there is a plurality of lateral vision modules 110 to be described later. The blocking plate 140 may be provided between the plurality of adjacent lateral vision modules 110. For example, referring back to FIG. 1, the lateral vision modules 110 may be horizontally provided at intervals of 90 degrees from each other when they are arranged in an array of 2×2 on a plane. The blocking plate 140 may be made of a material for minimizing optical transmissivity or preventing light transmission. The size of the blocking plate 140 may be appropriately selected to block light from a lateral lighting unit 111 of the adjacent lateral vision module 110 within the viewing angle of the lateral camera 120. Meanwhile, the blocking plate 140 may be fixedly connected to the external frame, the base or the like structure, but descriptions thereof will be omitted because such a structure is variously changeable.

The lateral vision module 110 may be configured to obtain the lateral images of the plurality of secondary batteries 1000. The lateral vision module 110 is configured to obtain the images of the plurality of secondary batteries 1000 picked up on one frame in the state that the plurality of secondary batteries 1000 are arranged in one row.

The lateral vision module 110 may include the lateral camera 120 and the lateral lighting unit 111. The lateral camera 120 has an appropriate viewing angle, and is disposed at a position spaced apart at a predetermined distance from the inspection position where the secondary batteries are picked up and arranged by the hand 130. The lateral camera 120 is provided as an area camera and configured to obtain a captured image for the inspection position including an image for about half of each secondary battery at a time of capturing. The lateral camera 120 may have an optical axis set perpendicularly to the array direction of the secondary batteries arranged at the inspection position. In other words, the lateral camera 120 may be disposed so that its optical axis can pass through the central position of the array when the plurality of secondary batteries are arranged.

The lateral lighting unit 111 may be configured to emit light to the plurality of secondary batteries picked up simultaneously. The lateral lighting unit 111 may include a plurality of light emitting units 112. Each light emitting unit 112 may be formed as extended in a horizontal direction. In other words, the light emitting area of the lateral lighting unit 111 may be formed in a direction perpendicular to the lengthwise direction of the picked-up secondary battery. Further, the plurality of light emitting units 112 may be vertically arranged side by side and configured to operate independently of each other.

The lateral lighting unit 111 may be disposed to emit light obliquely with respect to the array direction where the secondary batteries are picked up and arranged so that the light can be appropriately emitted avoiding interference with the lateral camera 120. For example, the lateral lighting unit 111 may be spaced apart at a predetermined distance from the inspection position, and disposed at an angle of 45 degrees to a central portion in the row of the plurality of picked-up secondary batteries 1000. However, such an angle is merely an example, and the lateral lighting unit 111 may be disposed at various angles.

The image processor (not shown) may be configured to process a captured image obtained by the lateral camera 120 and perform the inspection. The image processor may function to extract a partial image for each individual secondary battery from the plurality of captured images and generate one complete image of each individual secondary battery. In this regard, details will be described later.

The controller (not shown) may be configured to control the lateral camera 120, the hand 130, and the lateral lighting unit 111. The controller may be configured to control the position of the hand 130, and control the rotation of the gripper module 131. The controller may control the rotation of the gripper module 131, the operation of the lateral camera 120, and the operation of the lateral lighting unit 111 in connection with one another. The controller controls the gripper module 131 to rotate at the start of the inspection, and controls the operations of the lateral lighting unit 111 and the lateral camera 120 to be synchronized so that the lateral camera 120 can operate to obtain a captured image when the lateral lighting unit 111 operates to emit light to the inspection position. Further, the controller may control the lateral lighting unit 111 to emit light through the plurality of light emitting modules patterned in a predetermined order in the lateral lighting unit 111. However, such a controller may be configured with a widespread common processor, and thus detailed descriptions thereof will be omitted.

Figure 6:
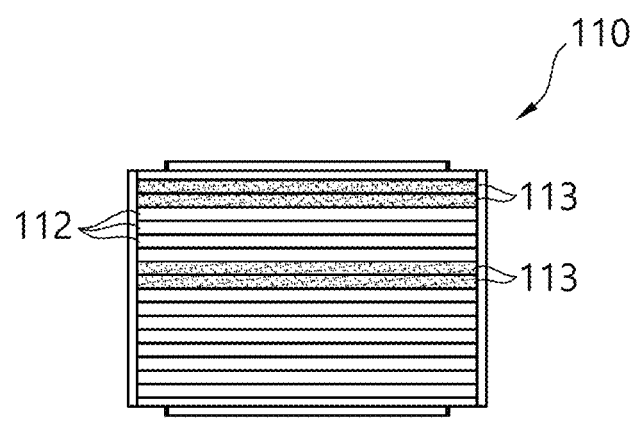
FIGS. 6, 7 and 8 are operational state views of a lateral lighting unit.
Figure 7:
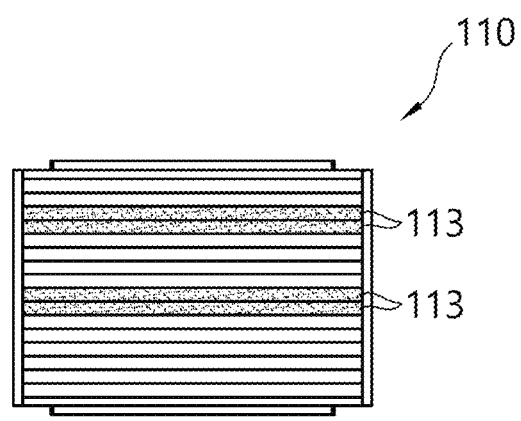
Figure 8:
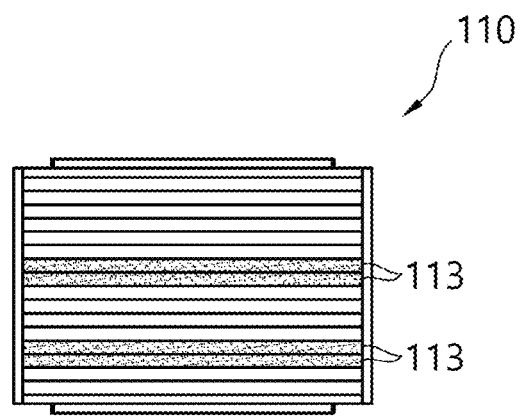

FIGS. 6, 7 and 8 are operational state views of a lateral lighting unit.

Referring to FIGS. 6, 7 and 8, as described above, the lateral lighting unit 110 includes a plurality of light emitting module, and the light emitting modules may be vertically arranged side by side in parallel with each other. The lateral lighting unit 110 may emit light by patterning a light emitting area 113 under control of the controller. For example, referring to FIG. 6, a first pattern may be formed to generate two straight light emitting areas 113 by simultaneously operating the uppermost light emitting module and a light emitting module spaced apart at a predetermined distance downward from the uppermost light emitting module. Further, referring to FIG. 7, a second pattern may be formed to generate light emitting areas 113 by emitting light in a pair of two straight lines parallel with each other in a horizontal direction, and shifting the position of a selected light emitting module to a lower side than that of the first pattern. Further, referring to FIG. 8, a third pattern may be formed to generate light emitting areas 113 by selecting the light emitting module at a position shifted to a lower side than that of the foregoing second pattern. In this way, the lateral lighting unit 110 emits light by shifting the light emitting positions in a vertical direction, and it is easier to detect a defect in an outer appearance because the light emitting positions are shifted in the lengthwise direction of the picked-up battery 1000, i.e., in the vertical direction.

Below, a process of obtaining a lateral image of a batteries by the first inspection module will be described with reference to FIGS. 9 to 11.

Figure 9:
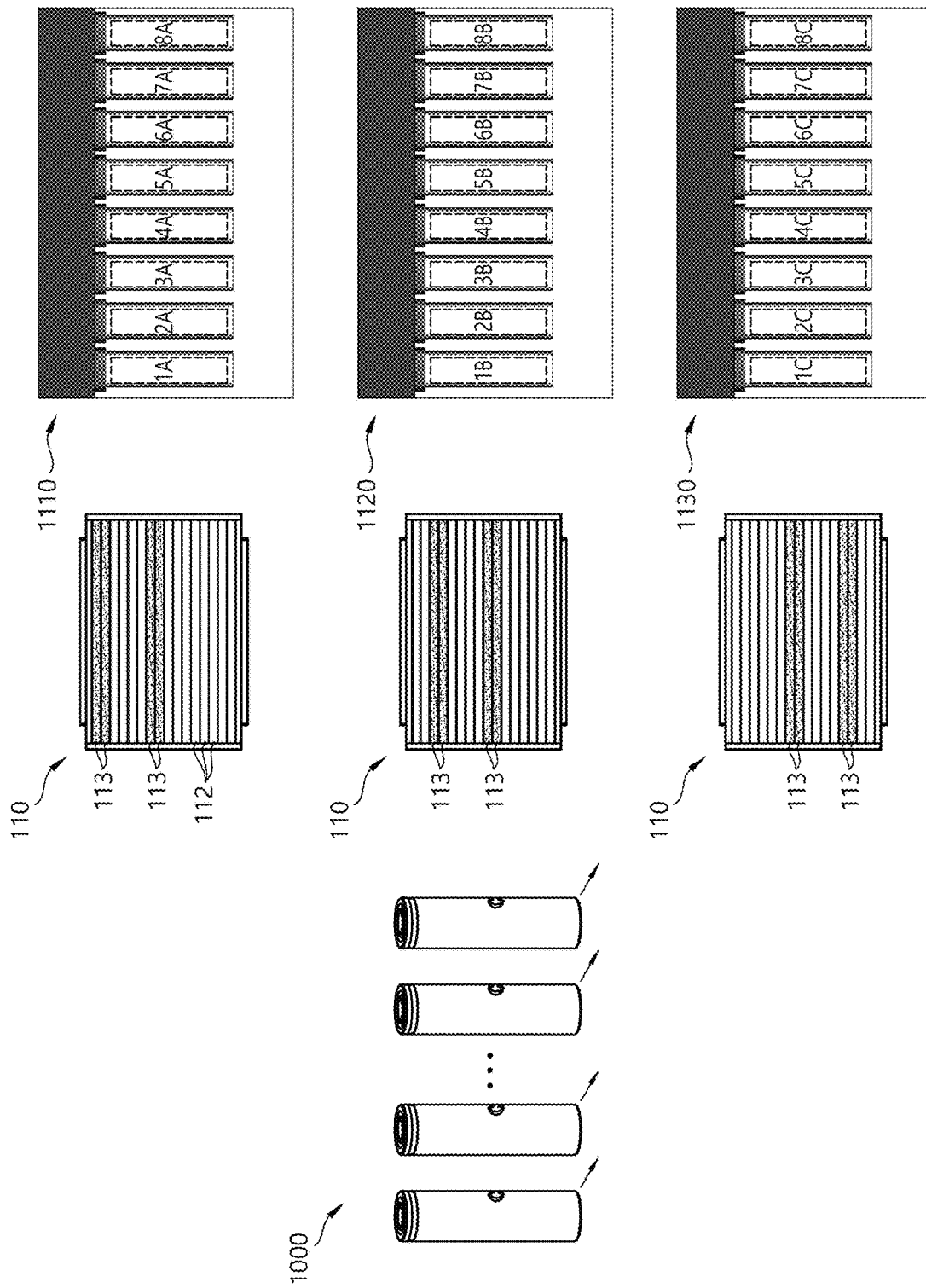
FIG. 9 is a view showing an operation of a lateral lighting unit and an obtained image when the batteries are disposed at a first angle.

FIG. 9 is a view showing an operation of a lateral lighting unit and an obtained image when the batteries are disposed at a first angle.

Referring to FIG. 9, a plurality of batteries is arranged side by side at the first angle. In this case, descriptions will be made on the premise that the number of batteries is eight. The batteries may be temporarily held by the hand (not shown) and their angles may be adjusted at the same time. In this case, the lateral lighting unit 110 may emit light in a pattern based on different lighting combinations in the state that the batteries are arranged at the first angle, thereby obtaining the images of the batteries. Specifically, an image 1110 is obtained while the lateral lighting unit 110 emits light in a first lighting pattern, an image 1120 is obtained while light is emitted in a second lighting pattern, and an image 1130 may be obtained while light is emitted in a third lighting pattern.

Each image shows a first battery LA, a second battery 2A, a third battery 3A, a fourth battery 4A, a fifth battery 5A, a sixth battery 6A, a seventh battery 7A and an eighth battery 8A, which are arranged sided by side, from the left in FIG. 9. In this case, the image includes an image of a lateral outer surface by about 180 degrees along a circumferential direction of the battery.

Figure 10:
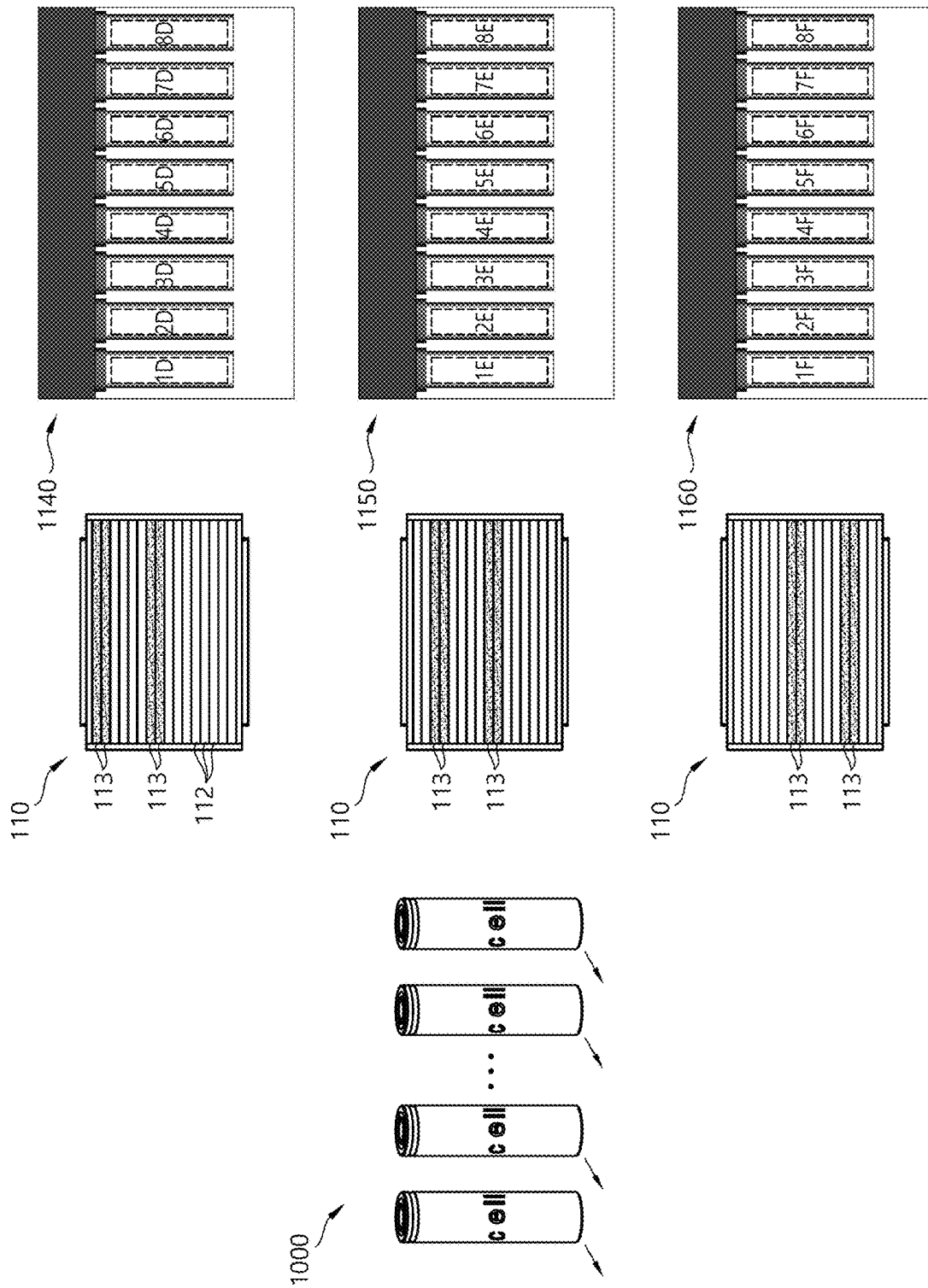
FIG. 10 is a view showing an operation of a lateral lighting unit and an obtained image when the batteries are disposed at a second angle.

FIG. 10 is a view showing an operation of a lateral lighting unit and an obtained image when the batteries are disposed at a second angle.

After obtaining the lateral images at the first angle of FIG. 9, the controller operates the grippers to rotate all the eight batteries by the same angle so that the batteries can be arranged at the second angle. For example, the second angle may differ from the first angle by 120 degrees. Then, like that of FIG. 9, the first camera obtains images 1140, 1150 and 1160 in synchronization with the lateral lighting unit 110 that emits light while shifting to the first lighting pattern, the second lighting pattern and the third lighting pattern.

Figure 11:
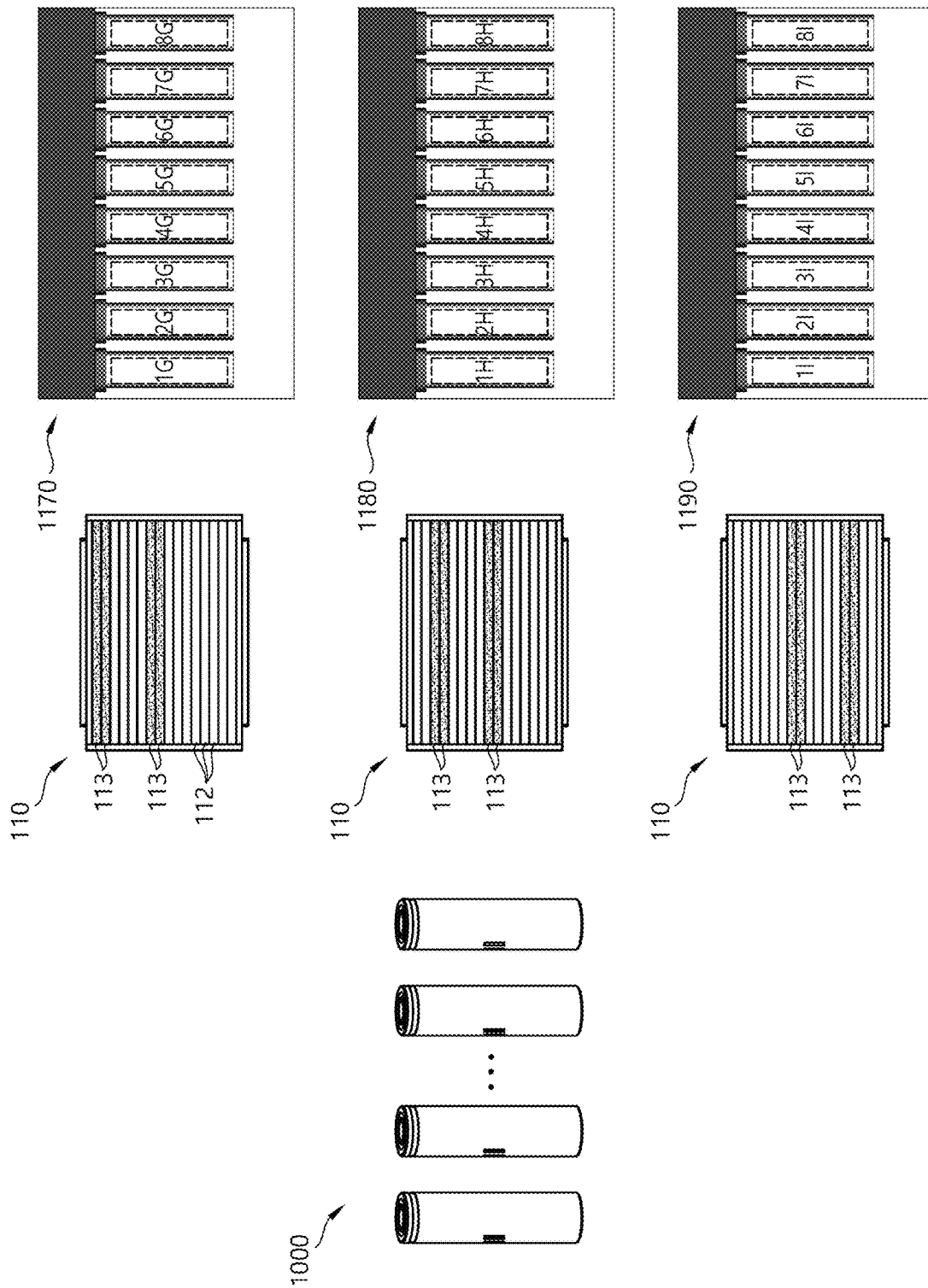
FIG. 11 is a view showing an operation of a lateral lighting unit and an obtained image when the batteries are disposed at a third angle.

FIG. 11 is a view showing an operation of a lateral lighting unit and an obtained image when the batteries are disposed at a third angle.

Referring to FIG. 11, after obtaining the lateral images at the second angle of FIG. 10, the controller operates the grippers to rotate all the eight batteries by the same angle so that the batteries can be arranged at the third angle. For example, the third angle may differ from the second angle by 120 degrees. Then, like that of FIG. 9, the first camera obtains images 1170, 1180 and 1190 in synchronization with the lateral lighting unit 110 that emits light while shifting to the first lighting pattern, the second lighting pattern and the third lighting pattern.

As described above with reference to FIGS. 6 to 11, the controller operates the gripper module 131 to rotate the plurality of picked-up batteries by a predetermined angle so as to obtain images. For example, the predetermined angle may be 120 degrees. This is because it is difficult to obtain an accurate outer image of a cylinder due to the limit of a view angle when a cylindrical battery is captured as a flat image. In other words, the captured image is an image of 180 degrees corresponding to about half of the battery, but it is difficult to accurately determine a defect through the obtained image in an area where the direction of the tangent line on the outer surface of the cylindrical battery is similar to the optical axis, i.e., toward the left and right ends when being captured. Therefore, parts corresponding to areas of 120 degrees are extracted from the captured images, and then reconstructed as the whole image of 360 degrees to determine a defect. However, such a rotation angle is merely an example. To increase the accuracy, the battery may be rotated at intervals of 90 degrees, or more frequently, at intervals of 60, 45 or 30 degrees, and the capturing positions may be adjusted corresponding to the rotation angles. Below, descriptions will be made on the assumption that the batteries are rotated at intervals of 120 degrees and their lateral images are obtained three times.

Below, it will be described with reference to FIGS. 10 to 14 that the image processor generates a lateral inspection image for the battery.

Figure 12:
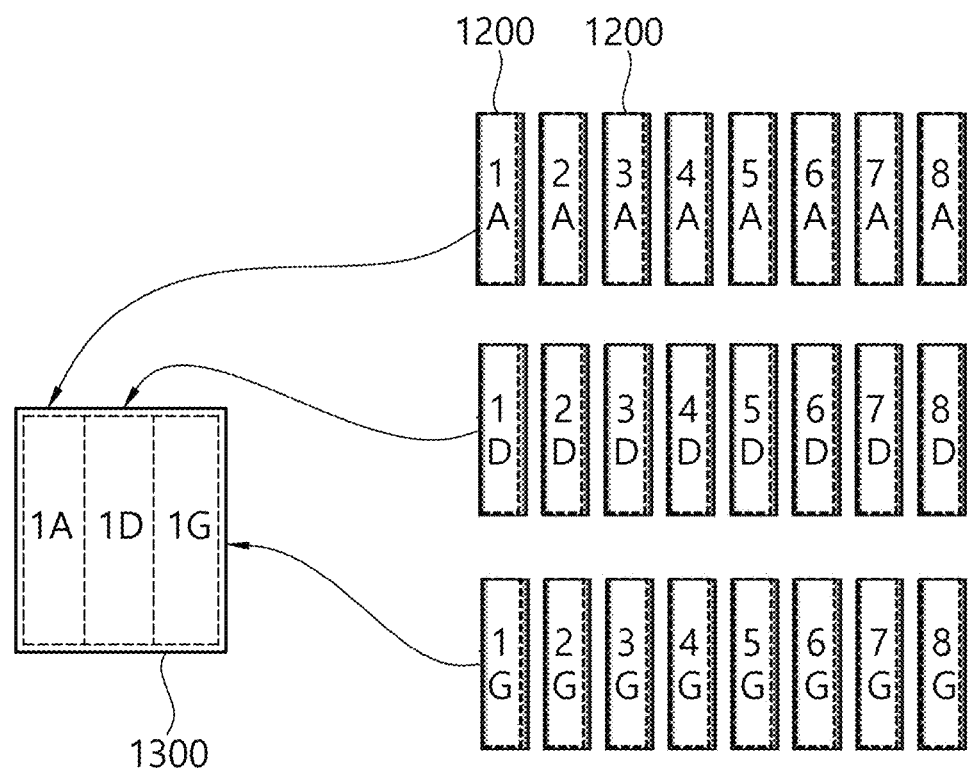
FIG. 12 is a view showing concept that an image processor combines lateral object images to generate a lateral inspection image.

FIG. 12 is a view showing concept that an image processor combines lateral object images to generate a lateral inspection image.

Referring to FIG. 12, the image processor may receive the captured image obtained by the first camera 120 and then generate a lateral inspection image. In each captured image, an image of partial lateral surfaces of a plurality of batteries may be obtained. In this case, it is difficult to check predetermined areas adjacent to the boundaries of opposite sides on the captured image of each battery, and thus an image for a predetermined area is extracted with respect to the axis of bilateral symmetry except the predetermined area adjacent to the boundaries. The image processor extracts an entity image area 1200, in which each battery is captured, from one obtained image. The image processor extracts the entity image areas 1200 from all the obtained images 1110, 1120, 1130, 1140, 1150, 1160, 1170, 1180 and 1190. Therefore, the number of extracted entity image areas may be determined by multiplying the number of captured images and the number of picked-up batteries.

The image processor may extract 72 entity image areas in the case of the foregoing example described with reference to FIGS. 13 to 16.

Figure 13:
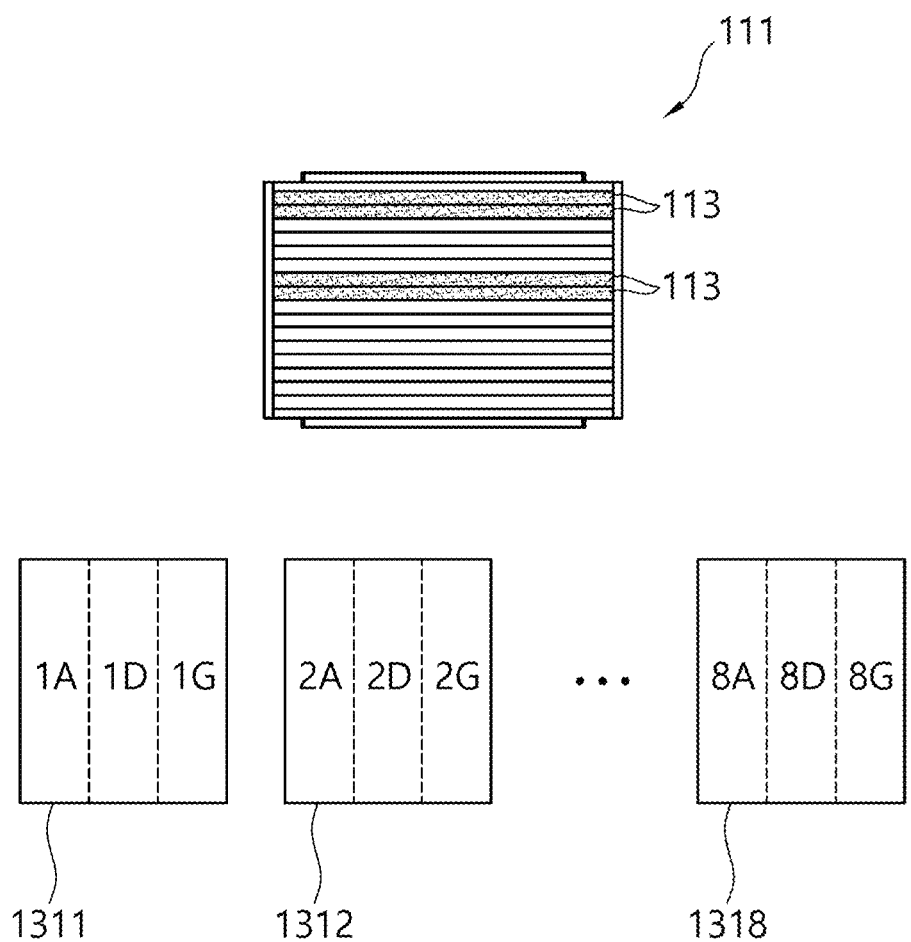
FIG. 13 is a view showing lateral inspection images of a plurality of batteries, which are obtained when a lateral lighting unit emits light in a first pattern.

FIG. 13 is a view showing lateral inspection images of a plurality of batteries, which are obtained when a first lighting unit emits light in a first pattern.

After extracting the entity image areas, the image processor combines and composites the extracted images according to the lighting patterns, according to the batteries, and according to the rotation angles of the batteries.

Referring to FIG. 13, the images of the first battery captured in the first lighting pattern, which are the image 1A at the rotation angle of 0 degrees, the image 1D at the rotation angle of 120 degrees and the image 1G at the rotation angle of 240 degrees, are combined in sequence to generate a lateral inspection image 1311 of a first battery in the first pattern.

The foregoing process of generating the lateral inspection image is applied to the first to eighth batteries, and thus eight lateral inspection images captured by selecting the light emitting area 113 in the first pattern are generated. For convenience of description, FIG. 13 shows a first battery lateral inspection image 1311 in the first pattern, a second battery lateral inspection image 1312 in the first pattern, and an eighth battery lateral inspection image 1318 in the first pattern.

Figure 14:
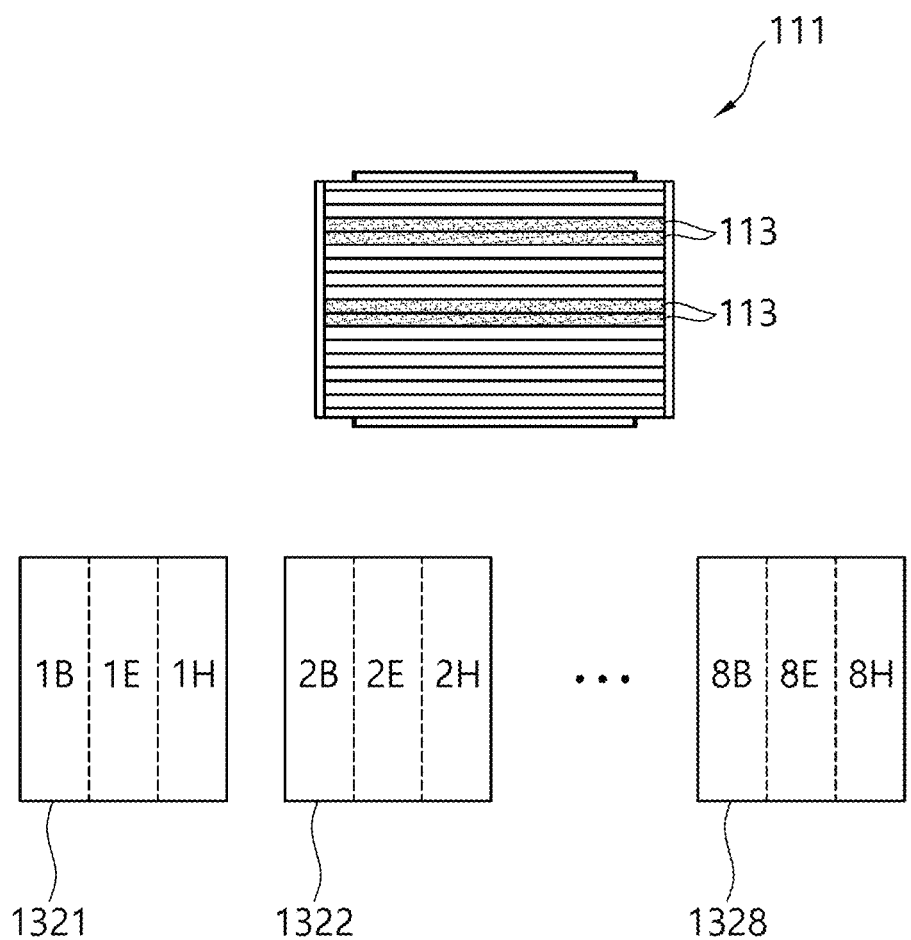
FIG. 14 is a view showing lateral inspection images of a plurality of batteries, which are obtained when a lateral lighting unit emits light in a second pattern.

FIG. 14 is a view showing lateral inspection images of a plurality of batteries, which are obtained when a first lighting unit emits light in a second pattern.

FIG. 14 shows the lateral inspection image of each battery when the lateral lighting unit 110 emits light by selecting the light emitting area 113 in the second lighting pattern. For convenience of description, FIG. 14 shows a first battery lateral inspection image 1321 in the second lighting pattern, a second battery lateral inspection image 1322 in the second lighting pattern, and the eighth battery lateral inspection image 1328 in the second pattern.

Figure 15:
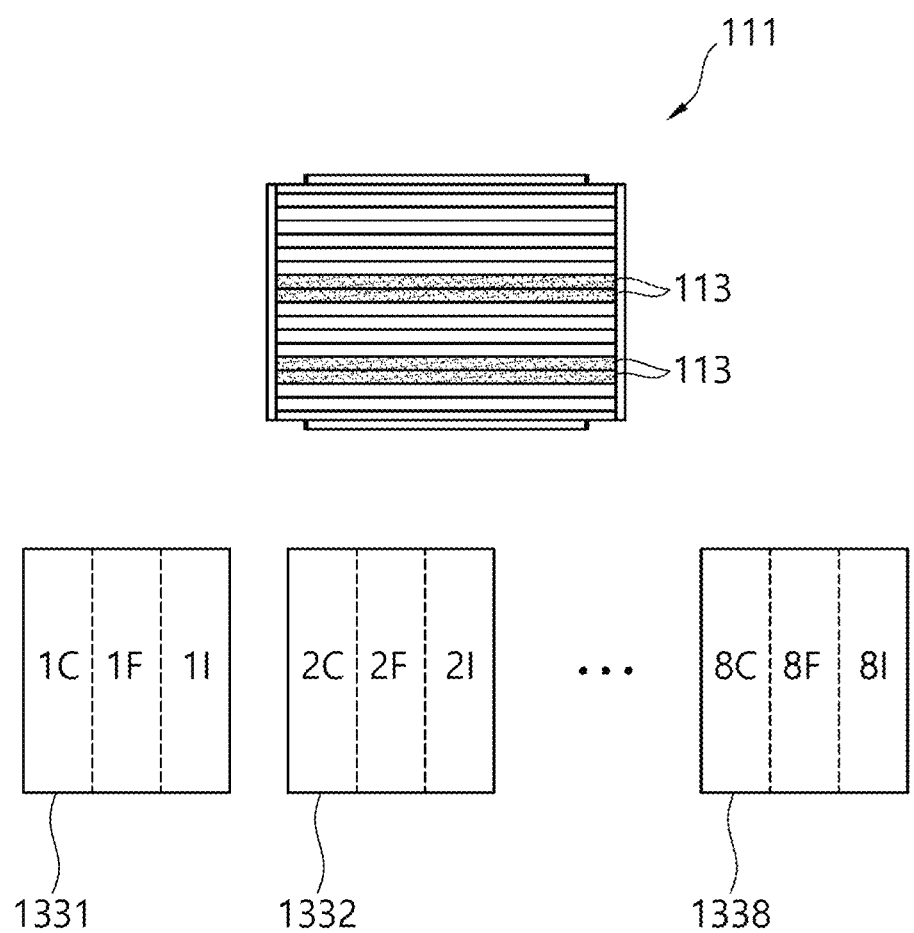
FIG. 15 is a view showing lateral inspection images of a plurality of batteries, which are obtained when a lateral lighting unit emits light in a third pattern.

FIG. 15 is a view showing lateral inspection images of a plurality of batteries, which are obtained when a first lighting unit emits light in a third pattern.

FIG. 15 shows the lateral inspection image of each battery when the lateral lighting unit 110 emits light by selecting the light emitting area 113 in the third lighting pattern. For convenience of description, FIG. 15 shows a first battery lateral inspection image 1331 in the third pattern, a second battery lateral inspection image 1332 in the third pattern, and the eighth battery lateral inspection image 1338 in the third pattern.

Figure 16:
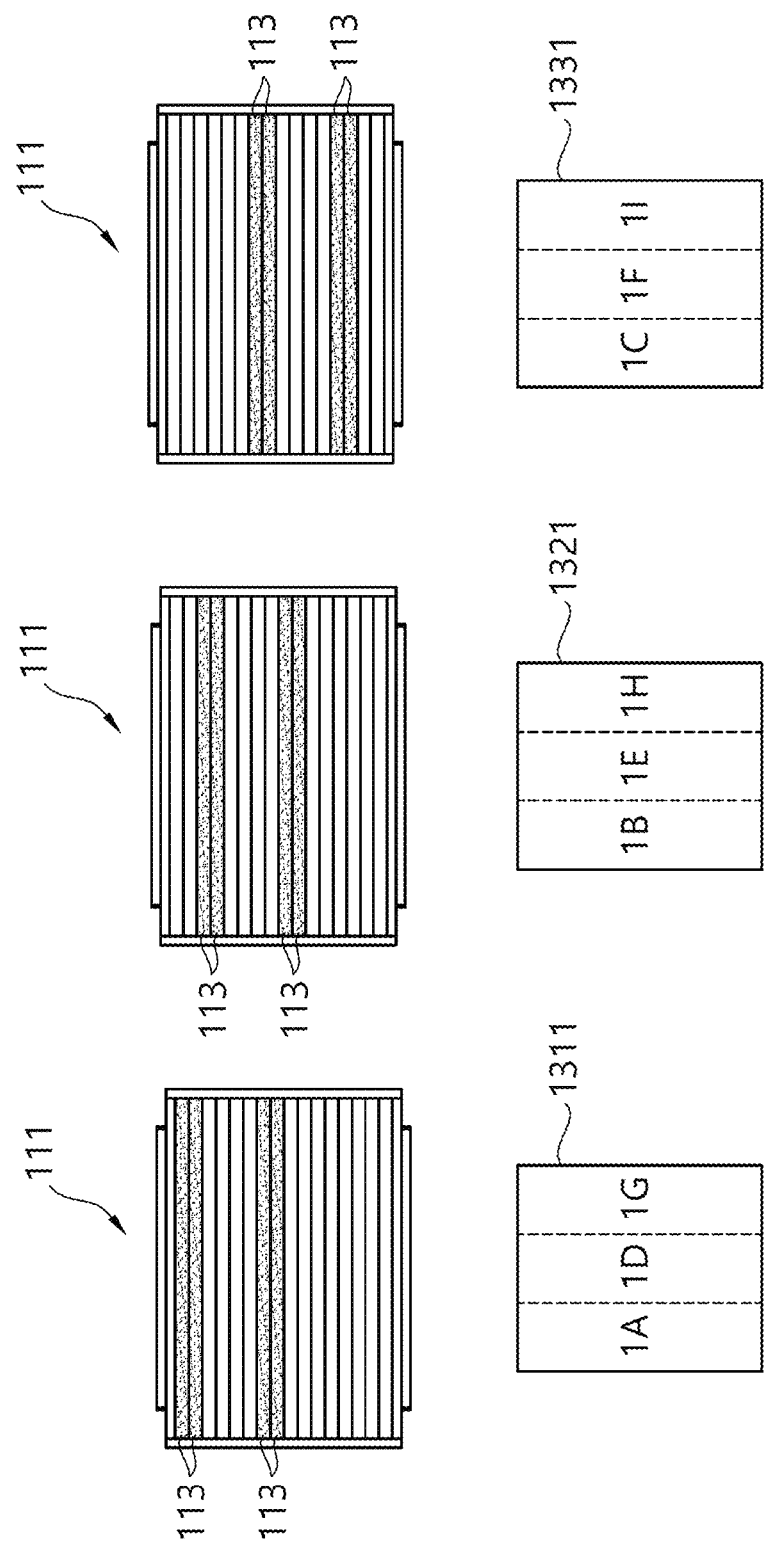
FIG. 16 is a view showing concept that a plurality of inspection images of one battery are obtained when one lateral inspection is completed.

FIG. 16 is a view showing concept that a plurality of inspection images of one battery are obtained when one lateral inspection is completed.

Referring to FIG. 16, three lateral inspection images are illustrated with respect to the first battery.

For better understanding, both the patterns of the lighting unit 110 and the obtained lateral inspection images are shown at a time.

In FIG. 16, the inspection image 1311 of the first battery with the first pattern is shown on the left, the inspection image 1321 of the first battery with the second pattern is shown in the middle, and the inspection image 1331 of the first battery with the third pattern is shown on the right. Eventually, the entity image areas of each battery are extracted from the captured lateral images and combined to obtain a complete lateral inspection image of the entire lateral surface. Further, the inspection images are obtained with light emitted while shifting the lighting pattern.

With this, the image processor performs the lateral appearance inspection for each battery and determines whether there is a defect. In other words, the image inspection shown in FIG. 16 may be performed with respect to all the first to eighth batteries.

When the lateral inspection is performed for the plurality of batteries, the plurality of batteries are arranged and captured at the same time to obtain the lateral images thereof, thereby significantly speeding up the lateral appearance inspection.

Below, the top and bottom inspection modules will be described in detail with reference to FIGS. 17 to 27.

Figure 17:
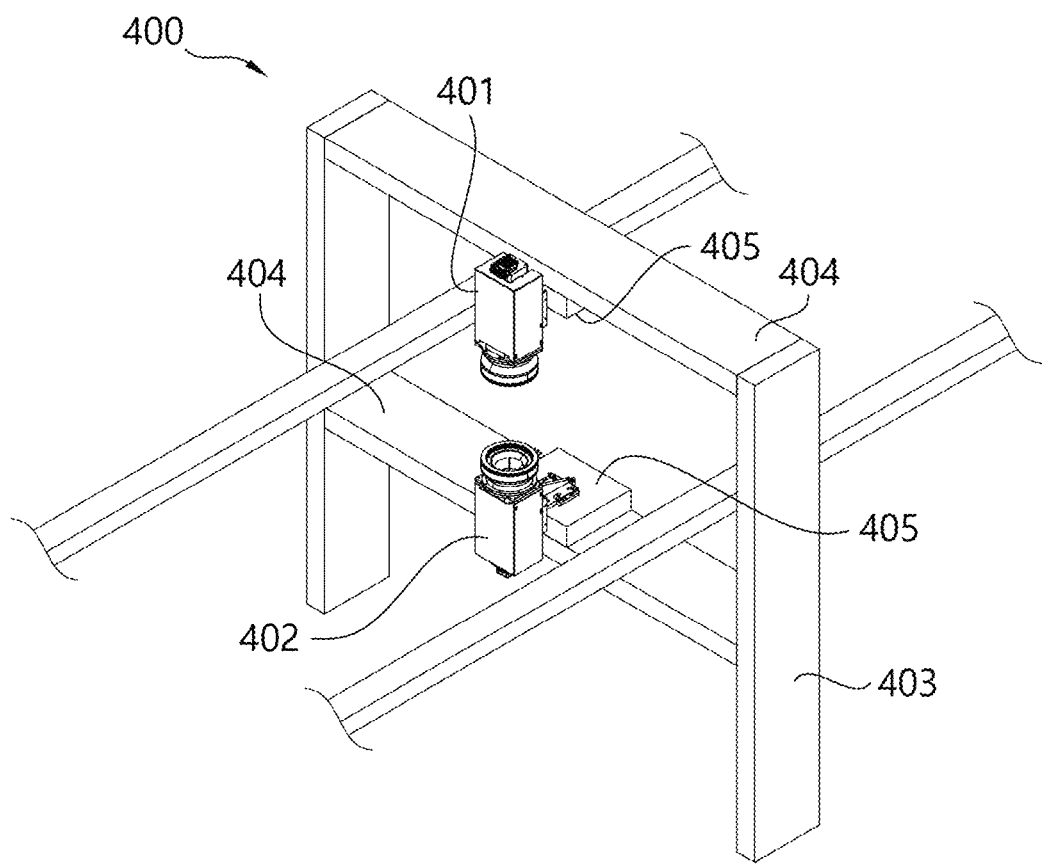
FIG. 17 is a perspective view of top and bottom inspection modules.

FIG. 17 is a perspective view of the top and bottom inspection modules.

Referring to FIG. 17, the top and bottom inspection modules 400 may include a top inspection module 401, a bottom inspection module 402, a vertical frame 403, a horizontal frame 404, and a horizontal actuator 405.

The top and bottom inspection modules 400 may include a top inspection module 401 and a bottom inspection module 402, and the tray 300 may be moved to a space between the top vision inspection module 401 and the bottom vision inspection module 402 by the tray shuttle 200. The top and bottom inspection modules 400 may obtain the top and bottom images of the plurality of secondary batteries arranged in a row while the top vision inspection module 401 and the bottom vision inspection module 402 are moving in a horizontal direction perpendicular to the moving direction of the tray 300.

The vertical frame 403 and the horizontal frame 404 are configured to support the horizontal actuator 405, the top inspection module 401, and the bottom inspection module 402. The horizontal frames 404 may be spaced apart from each other in a vertical direction while forming a pair, so that the tray can move horizontally and pass between the pair of horizontal frames 404.

The horizontal actuators 405 may form a pair, and be configured to move the top inspection module 401 and the bottom inspection module 402 on the horizontal frame 404 along the extension direction of the horizontal frame 404. However, such a configuration may employ a widespread linear actuating element, and thus descriptions thereof will be omitted.

When the top/bottom inspection for one row is completed, the operation of obtaining each image of the arranged secondary batteries is repeated by moving the top and bottom inspection modules 400 in a direction perpendicular to the transporting direction of the tray after the tray is transported a predetermined distance (as much as the width of the cell). Meanwhile, the top inspection module and the bottom inspection module may obtain both the top and bottom images of one secondary battery at a time. Alternatively, a control method may be modified to obtain the top image and the bottom image at different points of time. In this case, the top and bottom images for one secondary battery may be obtained at different points of time, or the top images or bottom images for different secondary batteries may be obtained. Below, descriptions will be made on the premise that the top inspection module and the bottom inspection module obtain the top and bottom images for one secondary battery simultaneously.

Figure 18:
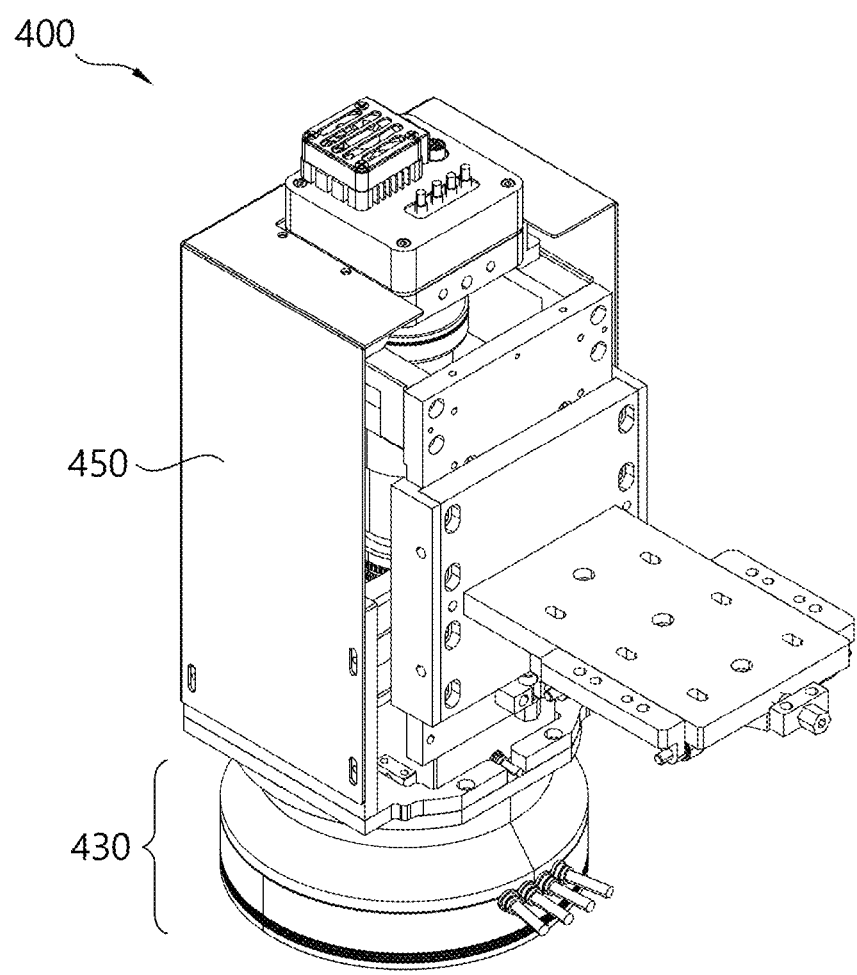
FIG. 18 is a perspective view of a top inspection module or a bottom inspection module.
Figure 19:
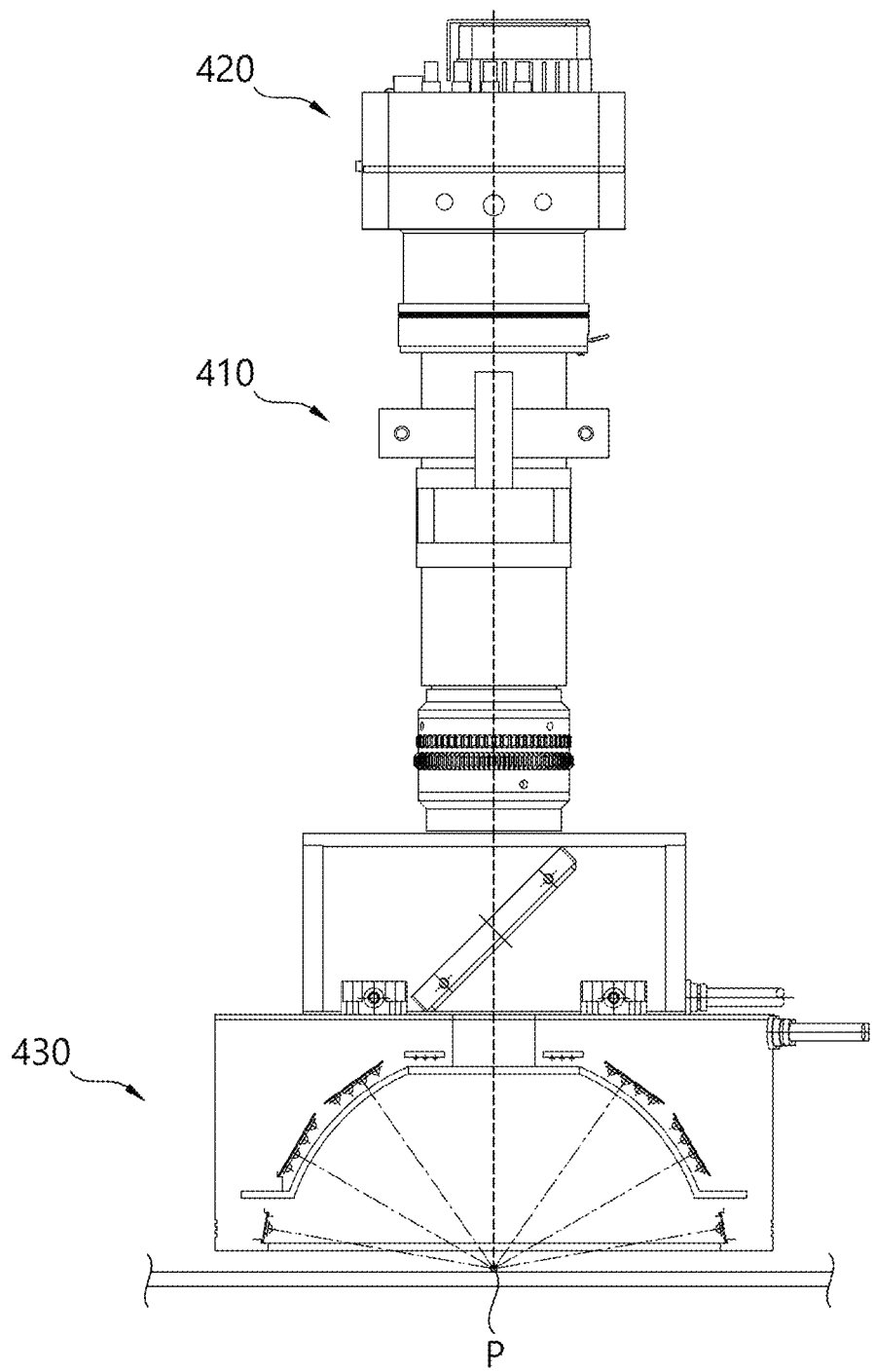
FIG. 19 is a cross-sectional view showing an optical axis of a top inspection module.

FIG. 18 is a perspective view of the top inspection module or the bottom inspection module, and FIG. 19 is a cross-sectional view of the top inspection module according to the disclosure.

Referring to FIG. 18, the top inspection module 401 may include a top lighting unit 430 provided at a lower side, and a top camera. The top camera and the top lighting unit of the top inspection module may be arranged vertically, and configured to obtain an image by capturing the top of the secondary battery positioned at a lower side.

The bottom inspection module may have the same configurations as the top inspection module. To avoid repetitive descriptions, only the top inspection module 401 will be representatively described below without the description of the bottom inspection module 402.

Referring to FIG. 19, the secondary battery may be disposed on P with its top surface facing toward the top inspection module in the standing state, and disposed being aligned with a central portion of the optical axis of each lighting unit.

The light is emitted from a top lighting unit 430 toward an inspection position P, and, in this state, the top inspection module 401 may directly obtain the top image of the secondary battery.

Below, the configurations and functions of the top inspection module 401 will be described in detail with reference to FIGS. 20 to 24.

Figure 20:
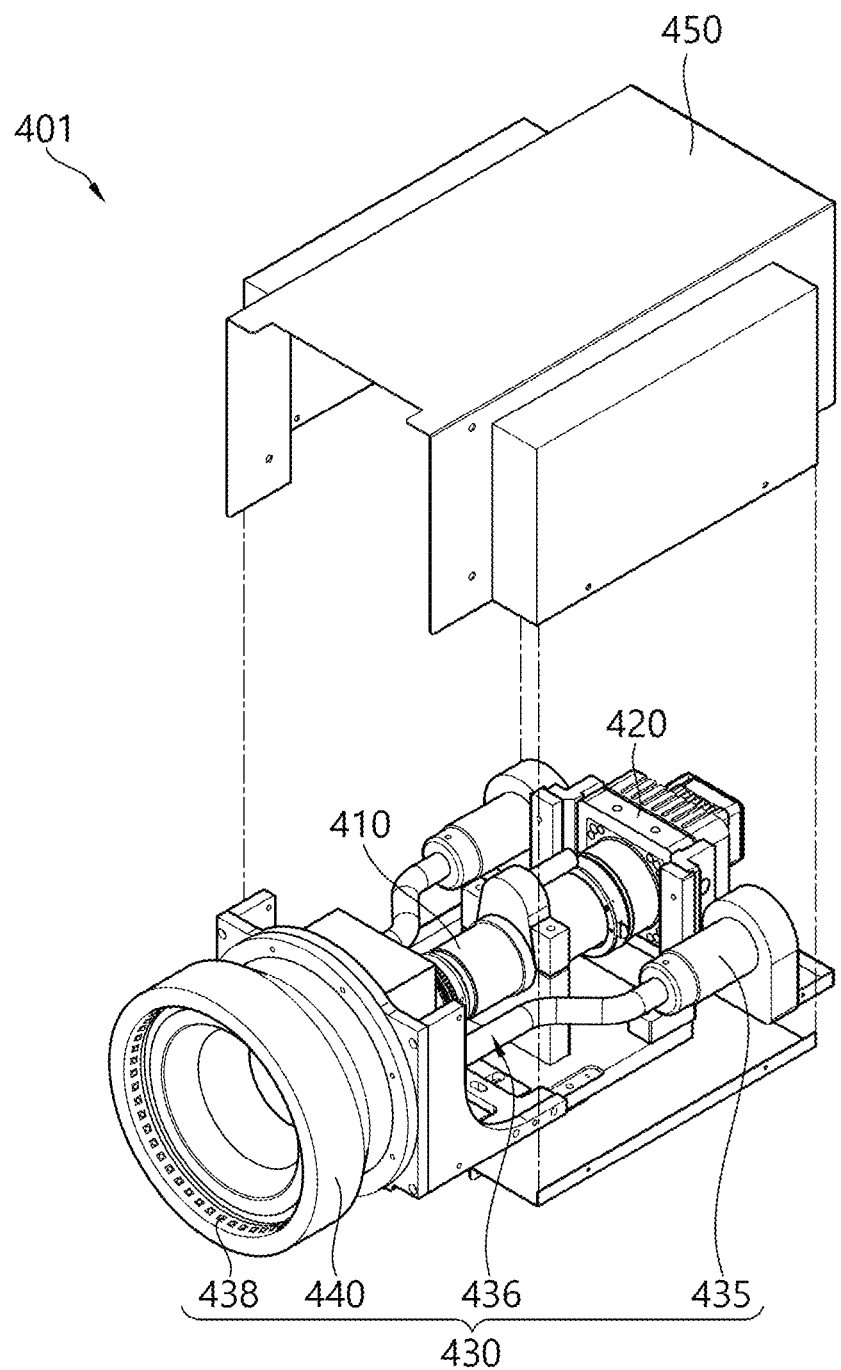
FIG. 20 is a partial exploded perspective view of a top inspection module.
Figure 21:
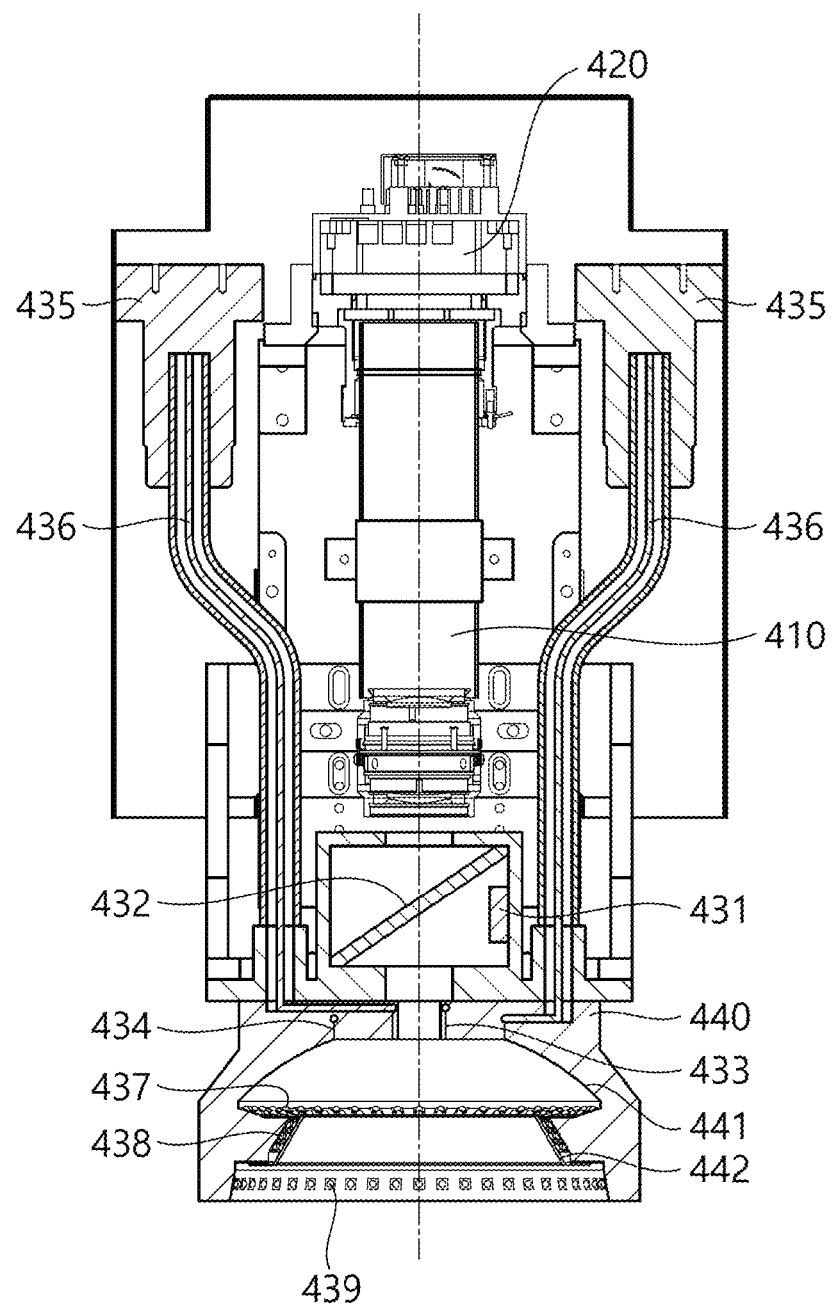
FIG. 21 is another cross-sectional view of a top inspection module.
Figure 22:
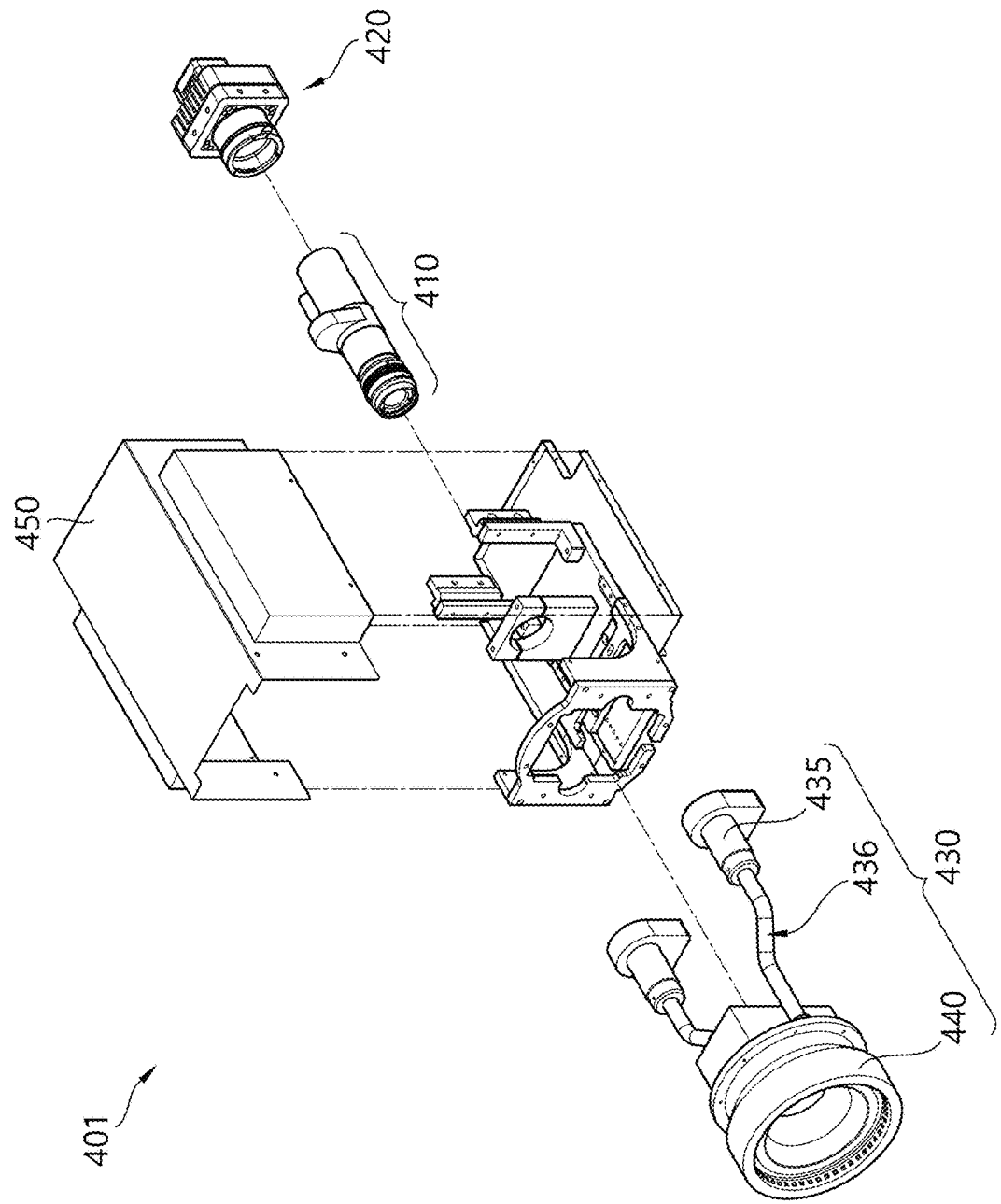
FIG. 22 is an exploded perspective view of a top inspection module.
Figure 23:
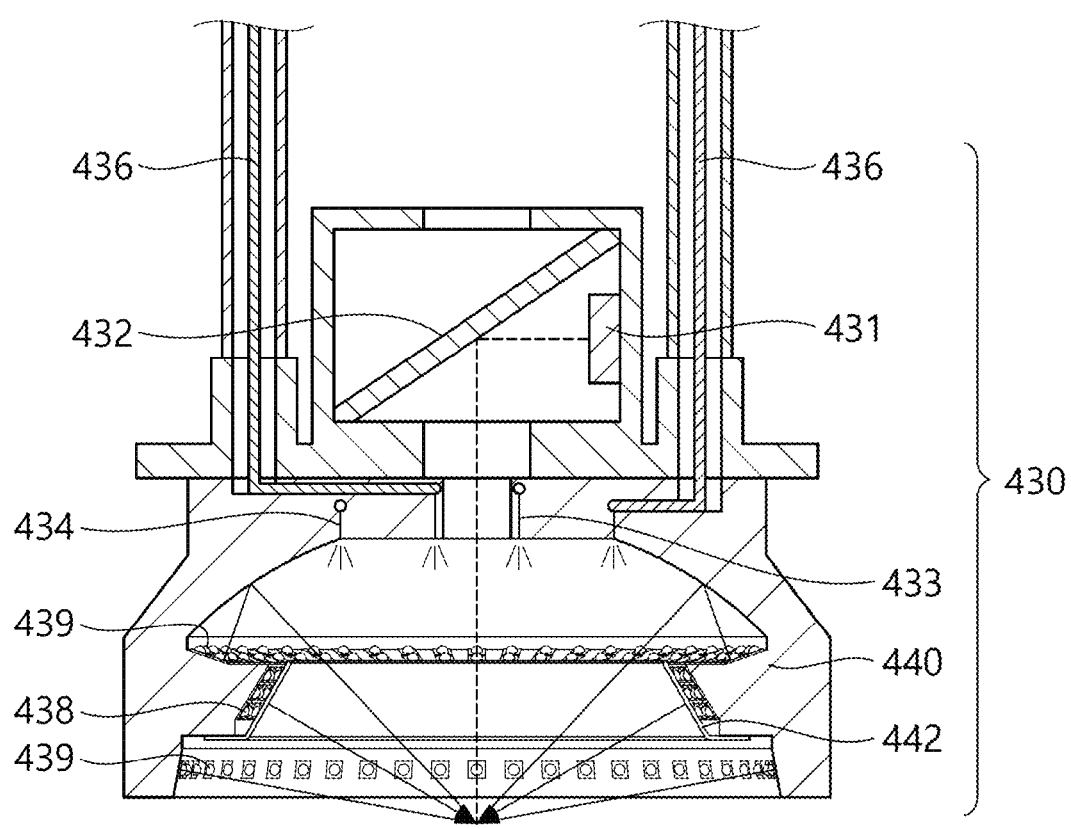
FIG. 23 is a cross-sectional view of a top lighting unit.
Figure 24:
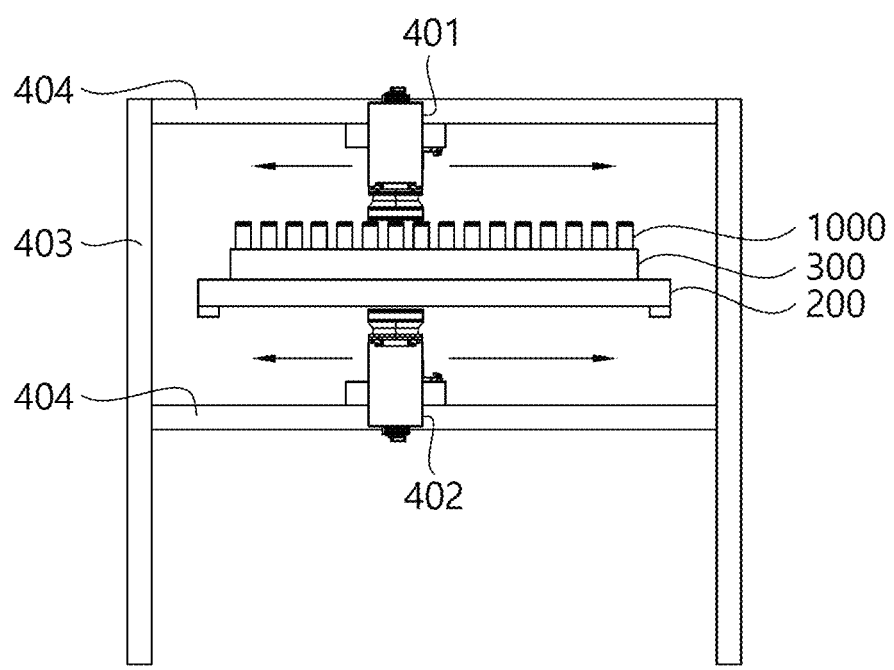
FIG. 24 is a lateral view showing that a tray is disposed between top and bottom inspection modules.

FIG. 20 is a partial exploded perspective view of the top inspection module 401, FIG. 21 is a cross-sectional view of the top inspection module, FIG. 22 is an exploded perspective view of the top inspection module, FIG. 23 is a cross-sectional view of the top lighting unit, and FIG. 24 is a lateral view showing that the tray is disposed between the top and bottom inspection modules.

Referring to FIGS. 20 to 23, the top inspection module 401 may be configured to obtain an image at an inspection position spaced apart by a predetermined distance on the optical axis. Meanwhile, the bottom inspection module 402 may have the same configuration as the top inspection module 401, but may be disposed to have a capturing direction opposite to that of the top inspection module 401. The top inspection module 401 may be configured to obtain an image while emitting light to the inspection position, and may also be configured to obtain an image while changing a focal distance.

The top inspection module 401 may include a lens module 410, an image sensor module 420, and a top lighting unit 430, and a casing 450 enclosing the lens module 410 and the image sensor module 420.

The lens module 410 is configured to change a focal length when obtaining an image of a subject, i.e., an object placed at the inspection position. The lens module 410 may include one or more lens kits. The lens is configured to change the focal length, and may for example include a polymer lens. In the case of including the polymer lens, the lens is varied in shape depending on an external force, thereby adjusting the focal length. In this case, a focal length adjuster (not shown) may be configured to change the shape of the polymer lens by transmitting a force to the polymer lens.

The image sensor module 420 may be configured to generate an electrical signal by capturing a subject. However, the image sensor module 420 may employ a widely used configuration, and thus more detailed descriptions thereof will be omitted.

The top lighting unit 430 may be configured to emit various types of light to an object. The object is made of various materials and has various shapes, and thus there may be a defect that is not detectable with a certain type of lighting due to its optical characteristics such as reflectivity and shadow. Therefore, the top lighting unit 430 emits various types of light, which are optically different in illumination angle, amount, etc. to check whether a defect is present in the outer appearance, thereby improving the accuracy in detecting the presence of the defect.

The top lighting unit 430 may include a plurality of light sources to emit various types of light. For example, the top lighting unit 430 may include a lighting frame 440, a coaxial lighting unit 431, a fiber lighting unit 433, a dome lighting unit 437, and inclined lighting units 438 and 439. The top lighting unit 430 may be configured to generally have rotational symmetry with respect to the optical axis. Further, the plurality of lighting units provided in the top lighting unit 430 is divided according to a plurality of areas along a rotational direction, and their operations are determined independently of each other. For example, the areas may be divided at intervals of 90 degrees along a rotational direction with respect to the optical axis. Alternatively, as necessary, the lighting units may be provided in two areas divided at intervals of 180 degrees and controlled to emit light.

The lighting frame 440 serves as a base in which various lighting units (to be described later) may be provided. The lighting frame 440 may be shaped like a cone, the radius of which becomes larger toward the inspection position, and has a first side adjacent to the lens module 410 and a second side adjacent to the inspection position. The lighting frame 440 may be formed with a hollow having a predetermined diameter in a center portion thereof to form the optical path. The lighting frame 440 may be shaped to have rotational symmetry with respect to the foregoing optical axis.

Meanwhile, the lighting frame 440 may be internally provided with at least two cutting surfaces on which the lighting units may be disposed at various angles. The at least two cutting surfaces are different in angle to the inspection position, so that the lighting units disposed on the cutting surfaces can emit light to the inspection position at different angles to each other. Meanwhile, the lighting frame 440 may be provided with a dome-type reflective surface 441 at one side thereof. The dome-type reflective surface 441 is configured to reflect light emitted from the dome lighting unit 437 (to be described later) to the inspection position.

The coaxial lighting unit 431 is configured to emit light along the same optical axis as an optical axis for obtaining the image by the image sensor module 420. The coaxial lighting unit 431 may be provided at one side of the foregoing lighting frame 440, and configured to emit light in a direction perpendicular to the foregoing optical axis.

A beam splitter 432 may be provided at a point where the optical path of the coaxial lighting unit 431 meets the optical axis of the lens module 410. The beam splitter 432 may be configured to pass light directed from the inspection position to the lens module 410 but reflect light emitted from the coaxial lighting unit 431 toward the inspection position.

The fiber lighting unit 433 may include a light source 435 at one side thereof to generate a larger amount of light than other lighting units, and a plurality of optical fibers penetrating the lighting frame 440 from the light source 435 and having one end exposed to the inside. The plurality of optical fibers 436 arranged along one circular path may be connected as a bundle to the light source 435.

The fiber lighting unit 433 may include a first fiber lighting unit 433 and a second fiber lighting unit 434 which are different in diameter of circular paths on which the ends thereof are disposed. Here, the first fiber lighting unit 433 and the second fiber lighting unit 434 refer to portions of the optical fiber bundles, which are exposed to the lighting frame 440 on the circular paths. The first fiber lighting unit 433 may be disposed along a circular path having a smaller diameter than that of the second fiber lighting unit 434.

The first fiber lighting unit 433 and the second fiber lighting unit 434 may be connected to the light sources 435 capable of generating a large amount of light, respectively. Referring to FIG. 21, for example, two light sources 435 are provided at left and right sides of the lens module 410, and transmit light to the first fiber lighting unit 433 and the second fiber lighting unit 434 through the plurality of optical fibers 436. Therefore, light may be selectively emitted along circular paths different in diameter from each other. However, the arrangement and number of optical fibers 436 are merely an example, and may be modified and applied in various numbers and combinations.

The dome lighting unit 437 is configured to emit light to the foregoing dome-type reflective surface 441, and may be disposed along a circular path. The light is emitted from the dome lighting unit 437 in a direction opposite to the inspection position, and reflected from the dome-type reflective surface 441 to the inspection position.

The inclined lighting units 438 and 439 are configured to emit light obliquely toward the inspection position. The inclined lighting units 438 and 439 may include a first inclined lighting unit 438 and a second inclined lighting unit 439 to emit light at different angles to the inspection position.

The first inclined lighting unit 438 may be configured to emit light at a greater angle to the inspection position than that of the second inclined lighting unit 439. The first inclined lighting unit 438 and the second inclined lighting unit 439 may be provided on the cutting surfaces having different inclinations on the lighting frame 440, respectively. The first inclined lighting unit 438 and the second inclined lighting unit 439 are configured to form circular paths along the cutting surfaces, and emit light while surrounding the inspection position. Meanwhile, a translucent plate 442 adjacent to the first inclined lighting unit 438 and made of a semi-transmissive material may be provided so that light emitted from the first inclined lighting unit 438 can be output as surface light.

The coaxial lighting unit 431, the dome lighting unit 437, the first inclined lighting unit 438 and the second inclined lighting unit 439 described above may include light emitting diodes (LED). Further, the dome lighting unit 437, the first inclined lighting unit 438, and the second inclined lighting unit 439 may include a plurality of LEDs and be provided on the lighting frame 440 along paths having rotational symmetry.

Meanwhile, the second lighting unit 430 may be controlled to emit light through one or more selected among the coaxial lighting unit 431, the fiber lighting unit 433, the dome lighting unit 437, and the inclined lighting unit, so that the image can be obtained. For example, the image may be obtained with light emitted by operating any one selected from among the lighting units or simultaneously operating a plurality of lighting units.

Meanwhile, as described above, like the top inspection module, the bottom inspection module may include a coaxial lighting unit, a fiber lighting unit, a dome lighting unit, and an oblique lighting unit, and may also include a camera.

Referring to FIG. 24, the tray 300 is disposed between the top inspection module 401 and the bottom inspection module 402, and obtains the top and bottom images of one secondary battery while the top inspection module 401 is positioned being in close contact with the top surface of the secondary battery and the bottom inspection module 402 is positioned being in close contact with the bottom of the secondary battery. In this case, as described above, the bottom of the secondary battery may be exposed downward through the hole formed in each loading space of the tray, and the bottom inspection module 402 captures the bottom of the secondary battery, thereby obtaining the image.

Meanwhile, the top inspection module 401 and the bottom inspection module 402 obtain the top and bottom images of each secondary battery while moving left and right in FIG. 24. When the images for one row are completely obtained, the tray shuttle 200 transports the tray 300 by one step, i.e., as much as the space between the arranged secondary batteries, and then the image inspection for the next row starts again.

Below, the operations of the top and bottom inspection modules will be described with reference to FIGS. 25 to 27. Further, the following descriptions will be made on the assumption that the inspection has been completed for the first to third row secondary batteries among the plurality of secondary batteries arranged and loaded in the tray.

Figure 25:
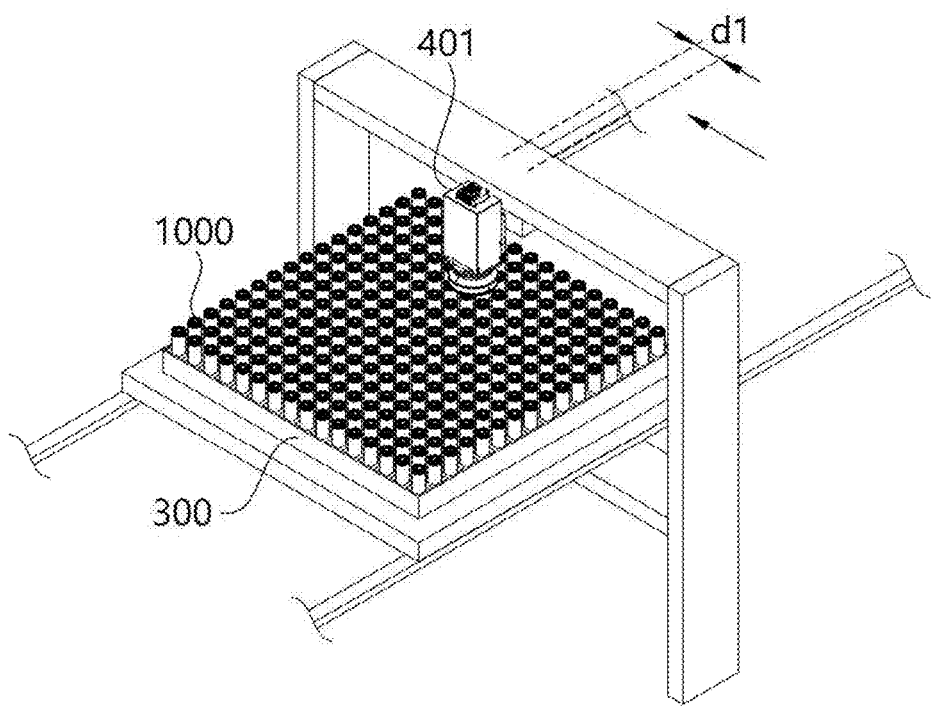
FIGS. 25, 26 and 27 are operational state views of top and bottom inspection modules.
Figure 26:
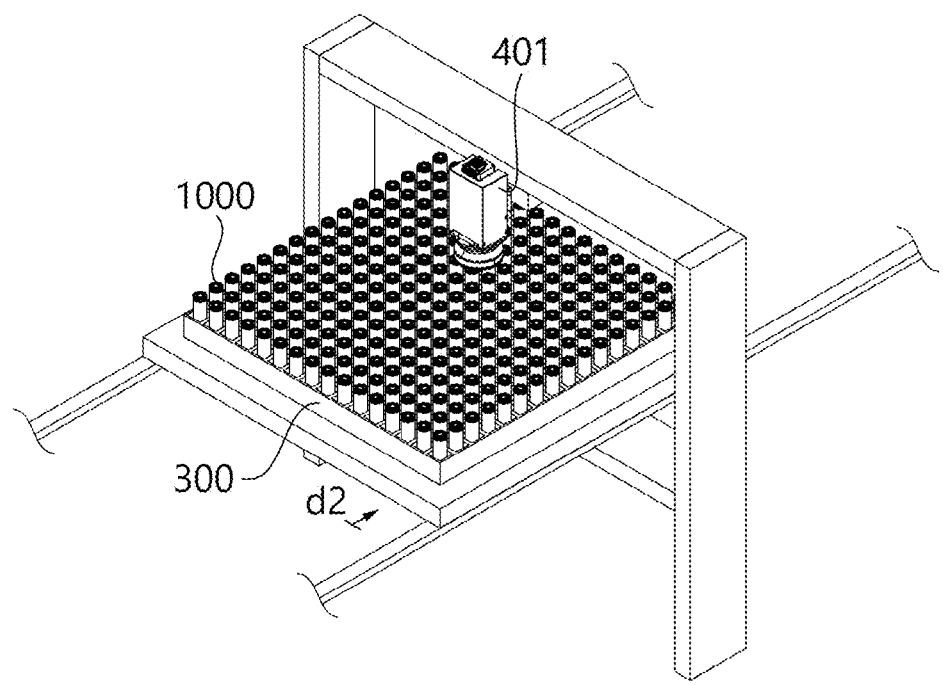
Figure 27:
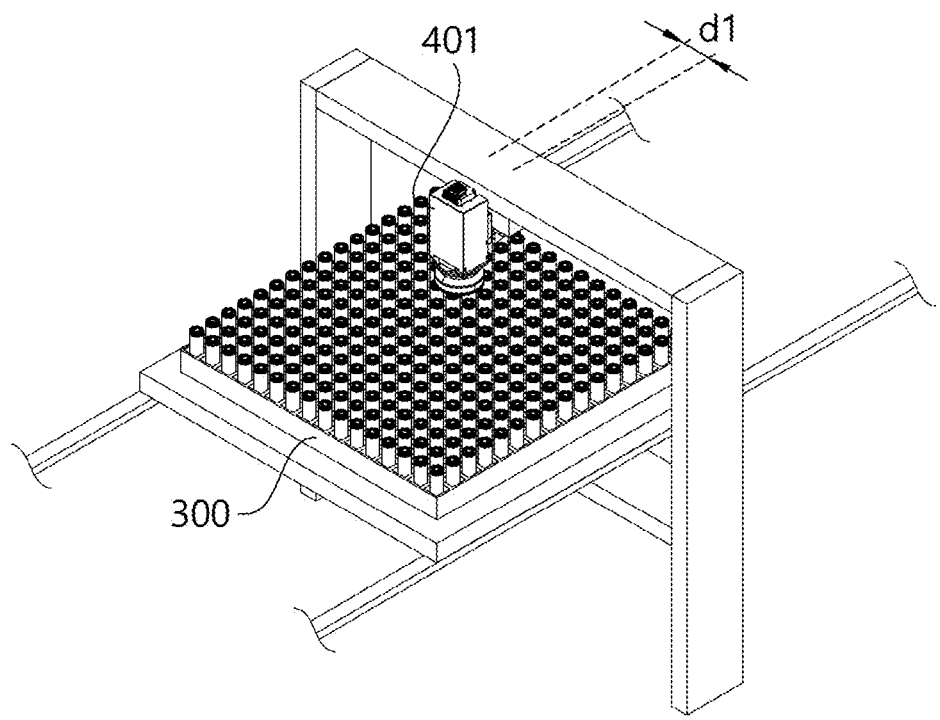

FIGS. 25, 26 and 27 are operational state views of top and bottom inspection modules.

First, referring to FIG. 25, the fourth row of the tray is disposed vertically below the top inspection module 401. Then, the top inspection module 401 and the bottom inspection module 402 obtain the top and bottom images of each secondary battery while being moved in a line direction by the horizontal actuator. In this case, the top inspection module 401 and the bottom inspection module 402 repeat the operations of obtaining the images by moving a predetermined distance, for example, a distance (first distance) d1 between the adjacent loading space in the tray, i.e., between the central axes of the loaded secondary batteries in the line direction after obtaining the top and bottom images for one secondary battery. In this way, the foregoing operation is repeated to obtain the top and bottom images for all the secondary batteries disposed in one line.

Then, referring to FIG. 26, the tray shuttle transports the tray a predetermined distance in the row direction. In this case, the tray may be moved a second distance d2, i.e., a distance between the central axes of the adjacent secondary batteries loaded in the tray in the row direction.

Then, referring to FIG. 27, the top and bottom images are repeatedly obtained by moving both the top inspection module 401 and the bottom inspection module 402 the first distance d1 in the line direction, thereby completing the inspection for the fifth line.

By repeating the foregoing operations shown in FIGS. 25 to 27, the top and bottom images of all the secondary batteries loaded in one tray are inspected.

Meanwhile, when the tray has a square loading space and the thickness of a partition wall is uniform, the first distance and the second distance may be equal to each other.

According to the disclosure, an appearance inspection apparatus for a secondary battery performs inspection for lateral images of a plurality of secondary batteries at the same time, and performs inspection for both top and bottom images of a secondary battery while the secondary battery is being loaded in a tray, thereby significantly speeding up appearance inspection.

What is claimed is:

1. An appearance inspection apparatus for a secondary battery, the apparatus comprising:
    a tray configured to load and arrange secondary batteries in a lengthwise direction, and comprising a plurality of holes through which bottoms of the loaded secondary batteries are exposed downward;
    a lateral inspection module configured to obtain a lateral image of the secondary battery while picking up and rotating the plurality of secondary batteries loaded in the tray; and
    top and bottom inspection modules configured to obtain top and bottom images of the secondary battery while the plurality of secondary batteries are being loaded in the tray,
    wherein the lateral inspection module comprises:
        a hand configured to pick up a predetermined number of secondary batteries among a plurality of secondary batteries loaded in the tray side by side, transport the picked-up secondary batteries to a lateral inspection position, and rotate the picked-up secondary batteries at a time;
        a lateral lighting unit configured to emit light to all the plurality of secondary batteries;
        a lateral camera configured to simultaneously obtain captured images of the plurality of secondary batteries to which the light is emitted; and
        an image processor configured to obtain an inspection image by processing the images obtained by the lateral camera,
    wherein the image processor divides the captured image obtained by the lateral camera into individual image areas as areas in which the secondary batteries are captured, respectively. and wherein the inspection image is generated by combining the individual image areas for each captured image of one secondary battery.

2. The apparatus of claim 1, wherein
the lateral lighting unit comprises a plurality of light emitting units configured to emit light at different positions,
the image processor generates at least two inspection images for each secondary battery based on images obtained with light emitted from different light emitting units among the plurality of light emitting units.

3. The apparatus of claim 2, further comprising a controller configured to control the lateral lighting unit, the lateral camera, and the hand,
wherein the controller controls the capturing of the lateral camera and the light emitting of the lateral lighting unit to be synchronized.

4. The apparatus of claim 3, wherein the controller controls the light emitting units of the lateral lighting unit, which are disposed at different positions, to operate in sequence along a lengthwise direction of the secondary battery picked up by the hand.

5. The apparatus of claim 4, wherein the image processor determines whether an outer appearance is defective based on at least one of brightness and contrast from the plurality of inspection images.

6. The apparatus of claim 4, wherein each light emitting unit is formed extending in a direction perpendicular to the lengthwise direction.

7. The apparatus of claim 6, wherein the controller controls the operating light emitting units to be switched along the lengthwise direction.

8. The apparatus of claim 7, wherein the lateral lighting unit is disposed to emit light obliquely with respect to a direction where the predetermined number of picked-up secondary batteries are arranged.

9. The apparatus of claim 8, wherein the lateral camera has an optical axis disposed perpendicularly to the direction where the predetermined number of picked-up secondary batteries are arranged.

10. The apparatus of claim 2, further comprising a tray shuttle configured to transport the tray between the lateral inspection module and the top and bottom inspection modules.

11. The apparatus of claim 10, wherein the top and bottom inspection modules comprise:
a top inspection module configured to obtain a top image of any one of the secondary batteries loaded in the tray; and
a bottom inspection module disposed to face the top inspection module with the tray therebetween.

12. The apparatus of claim 11, wherein
the top and bottom inspection modules comprise:
a vertical frame formed extending a predetermined length in a vertical direction; and
a pair of horizontal frames extending between the vertical frames in a horizontal direction, and spaced in parallel apart from each other, and
each of the top inspection module and the bottom inspection module is configured to horizontally move on the horizontal frame.

13. The apparatus of claim 12, wherein the top inspection module and the bottom inspection module are controlled to obtain the top image and bottom image of any one of the secondary batteries at a time.

14. The apparatus of claim 13, wherein the bottom inspection module is configured to obtain the bottom image of the secondary battery exposed through the hole formed at a lower side of the tray.

15. The apparatus of claim 13, wherein the top and bottom inspection modules further comprise a horizontal actuator configured to horizontally move the top inspection module and the bottom inspection module on the horizontal frame.

16. The apparatus of claim 15, wherein the horizontal actuator actuates the positions of the top inspection module and the bottom inspection module to be aligned with the position of the secondary battery for the next inspection after the top inspection module and the bottom inspection module obtain the top image and the bottom image of any one of the secondary batteries.

17. The apparatus of claim 16, wherein, after the top and bottom inspection modules obtain the top and bottom images of one line among the plurality of secondary batteries loaded in the tray, the tray shuttle is controlled to transport the tray a predetermined distance so that the plurality of secondary batteries for the next inspection can be aligned with the top and bottom inspection modules.

18. The apparatus of claim 16, wherein
the top inspection module comprises:
an image sensor module configured to obtain an image of at least a part of a camera module at a top inspection position;
a lens module provided on an optical path between the top inspection position and the image the sensor module, and configured to adjust a focal distance; and
a top lighting unit configured to emit light toward the top inspection position, and the top lighting unit comprises:
a coaxial lighting unit configured to emit light to the top inspection position coaxially with the optical path;
a fiber lighting unit comprising a plurality of optical fibers provided along a circumferential path having a predetermined radius with respect to a central axis of the optical path;
a dome lighting unit configured to emit light to a reflective surface provided at one side so that reflected light can be emitted to the top inspection position; and
an oblique lighting unit configured to emit light obliquely to the top inspection position.

19. The apparatus of claim 18, wherein the top inspection module is controlled to obtain the top image of the secondary battery while at least one of the coaxial lighting unit, the fiber lighting unit, the dome lighting unit, and the oblique lighting unit is operating.

* * * * *